United States Patent
Yamagami

(10) Patent No.: US 8,230,258 B2
(45) Date of Patent: Jul. 24, 2012

(54) CONTROL METHOD OF SYSTEM MONITORING DEVICE, PROGRAM, AND COMPUTER SYSTEM

(75) Inventor: Yoshihito Yamagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 830 days.

(21) Appl. No.: 12/174,731

(22) Filed: Jul. 17, 2008

(65) Prior Publication Data

US 2008/0276222 A1    Nov. 6, 2008

Related U.S. Application Data

(63) Continuation of application No. PCT/JP2006/301516, filed on Jan. 31, 2006.

(51) Int. Cl.
*G06F 11/00* (2006.01)
(52) U.S. Cl. .............. 714/15; 714/4.12; 714/13; 714/20
(58) Field of Classification Search .................. 714/4.1, 714/4.12, 10, 13, 15, 20
See application file for complete search history.

(56) References Cited

U.S. PATENT DOCUMENTS

| 6,601,186 | B1 | | 7/2003 | Fox et al. | |
|---|---|---|---|---|---|
| 6,698,017 | B1 | * | 2/2004 | Adamovits et al. | 717/168 |
| 6,795,966 | B1 | * | 9/2004 | Lim et al. | 718/1 |
| 7,571,349 | B2 | * | 8/2009 | Levidow et al. | 714/15 |
| 7,739,403 | B1 | * | 6/2010 | Balakrishna et al. | 714/4.1 |
| 2009/0089616 | A1 | * | 4/2009 | Chen et al. | 714/25 |

FOREIGN PATENT DOCUMENTS

| EP | 0 433 979 A2 | 12/1990 |
|---|---|---|
| JP | 4-84230 | 3/1992 |
| JP | 4-326843 | 11/1992 |
| JP | 6-95944 | 4/1994 |
| JP | 9-16288 | 1/1997 |
| JP | 9-288637 | 11/1997 |
| JP | 2002-333935 | 11/2002 |

OTHER PUBLICATIONS

Machine Translation of Detailed Discription, Taniguchi et al., JP 09-16288, published Jan. 17, 1997, paragraphs 0001-0009.*
Japanese Office Action mailed on Oct. 6, 2009 in corresponding Japanese Patent Application 2007-556715.
European Search Report dated Mar. 25, 2010 and issued in corresponding European Patent Application 06712659.9.
International Search Report mailed May 2, 2006 for corresponding International Application PCT/JP2006/301516.
Japanese Office Action issued Apr. 27, 2010 in corresponding Japanese Patent Application 2007-556715.

* cited by examiner

*Primary Examiner* — Scott Baderman
*Assistant Examiner* — Joseph D Manoskey
(74) *Attorney, Agent, or Firm* — Staas & Halsey LLP

(57) ABSTRACT

A system monitoring device retains hardware state information of a computer system and OS software state information of a hardware control instruction given by OS software and monitors and controls the entire computer system. When state change of the hardware state information and OS software state information is recognized, save information is stored in a non-volatile memory. When re-activation accompanying active replacement of the system monitoring device, which has failed, is recognized, the save information is read from the non-volatile memory, and the corresponding hardware state information and OS software state information before device failure is restored. The operating hardware is recognized according to save information, and the hardware state information generated for the recognized hardware during active replacement is restored. The operating OS software is recognized according to the save information, and the OS software state information generated for the recognized OS software during active replacement is restored.

12 Claims, 16 Drawing Sheets

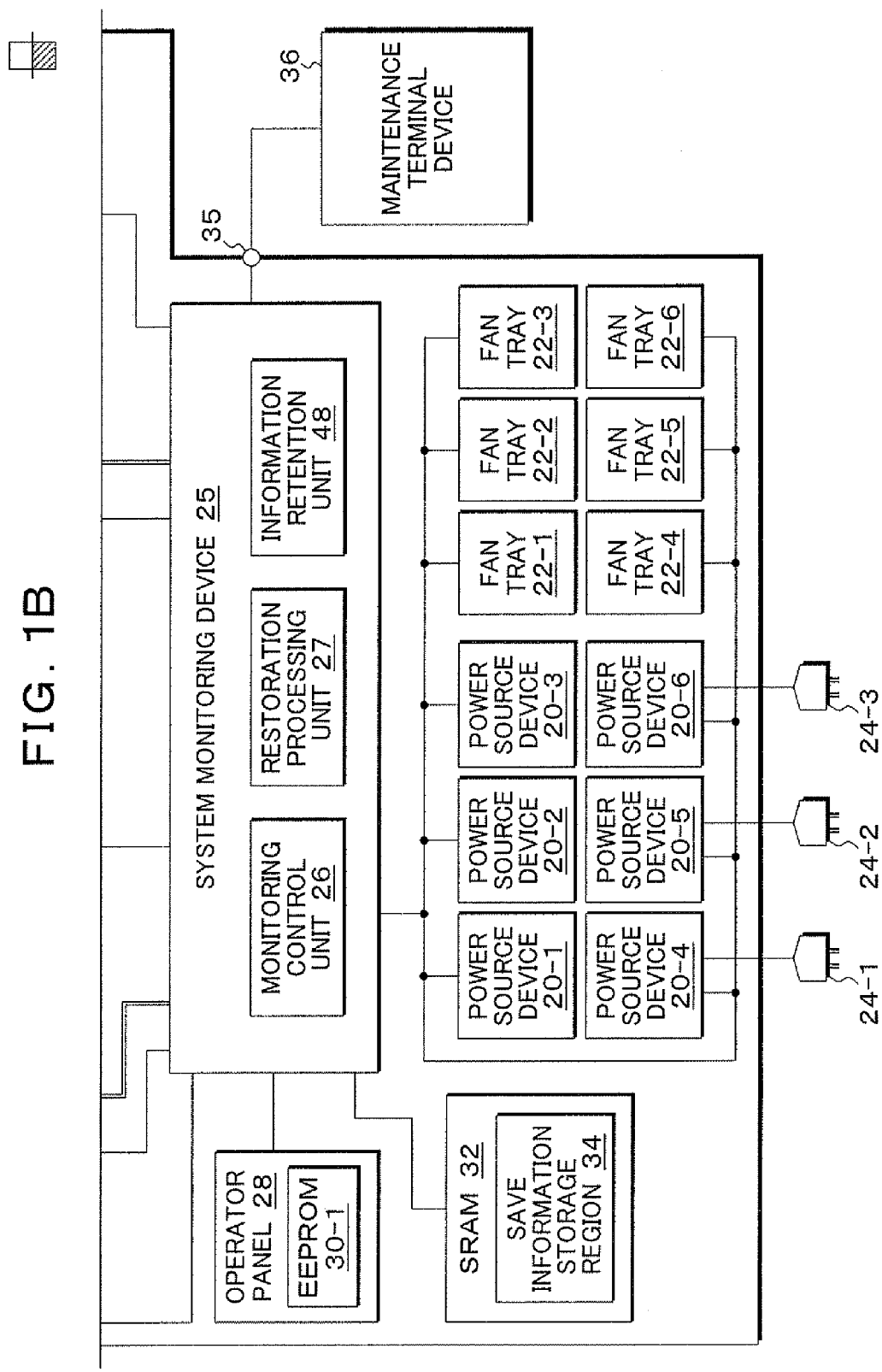

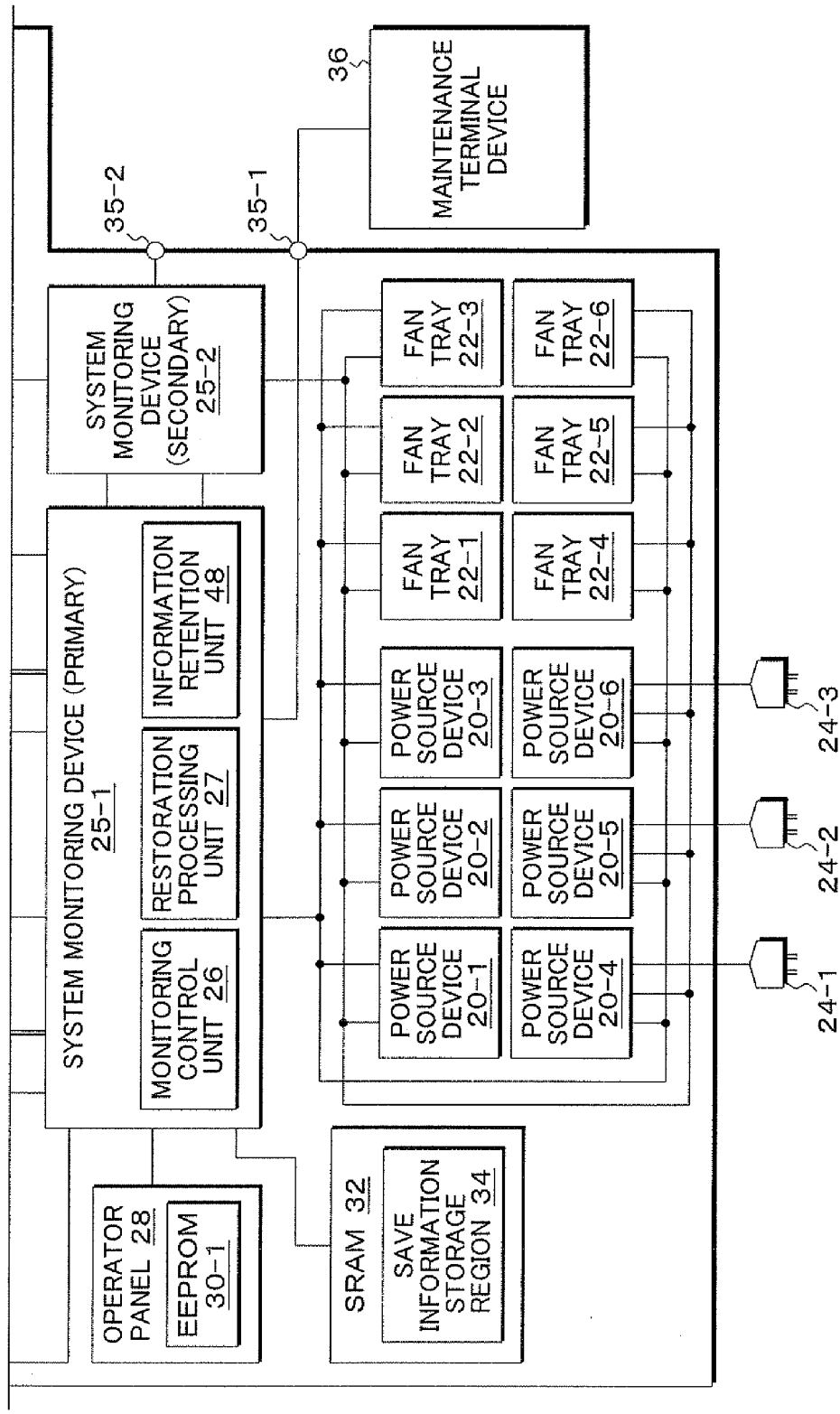

CONTROL METHOD OF SYSTEM MONITORING DEVICE, PROGRAM, AND COMPUTER SYSTEM

This application is a continuation of PCT/JP2006/301516, filed Jan. 31, 2006.

TECHNICAL FIELD

The present invention relates to a control method of a system monitoring device, a program, and a computer system which monitor/control an entire computer system which may include the control method of the system monitoring device, program, and computer system which enable active replacement upon failure of the system monitoring device without stopping the computer system.

BACKGROUND ART

Conventionally, in a computer system that realizes a mission-critical system having high sociality, as hardware, for example, in a maximum configuration, 128 CPUs, 512 G bytes of a maximum memory capacity, 128 hard disk drives of 73 G bytes, 320 PCI slots, and a maximum partition number of 15 are implemented to maximize the time limitations and throughput, thereby realizing extremely high processing performance, reliability, stability, and flexibility. For example, regarding the maximization of time limitations, the interior of a chassis is always monitored by many checkers, detected errors are automatically recovered by a data protection function such as ECC, system failure is avoided even in case of troubles by a dynamic degeneration function or redundancy mechanism by any possibility, and, furthermore, parts can be replaced without stopping the system since main components can be actively replaced. Regarding the maximization of the throughput, in order to adapt to change of transactions or the scale of operation, hardware resources are flexibly allocated by using a partition function and a dynamic reconfiguration function in combination so as to adapt to operations in which load is varied depending on time, for example, varied between day time and night time or end of a month and beginning of the month. In the partition function, a system board on which CPUs and memories are mounted is used as a unit, a plurality of partitions are set by combining one or plural system boards, and the interior of each system board is divided into partitions, for example, by two-CPU units, thereby realizing a flexible partition configuration and resource placement without being physically limited. The dynamic reconfiguration function enables addition and separation of CPUs, memories, and I/Os without stopping the system, thereby realizing addition of resources and replacement of parts of the system and flexible resource placement adapted to change of the amount of data or the amount of operations. In such a computer system realizing high reliability, high stability, and high flexibility, a system monitoring device (System Control Facility) that monitors and controls the entire system is provided. The system monitoring device is mounted on a dedicated board, retains user setting information, hardware state information, and OS software state information of the computer system so as to monitor and control the entire system, and gives a notification to outside when a malfunction occurs. When the system monitoring device of such a computer system fails, the system has to be stopped (power off) in order to subject the board to maintenance and replacement; however, depending on the operating mode of the system, active maintenance, in which maintenance and replacement is performed without stopping the system, has to be enabled.

Patent Document 1: Japanese Patent Application Laid-Open (kokai) No. H4-326843
Patent Document 2: Japanese Patent Application Laid-Open (kokai) No. H4-084230

However, when active replacement is performed without stopping the system upon failure of the system monitoring device, system state information that is retained merely in the system monitoring device is lost due to the active replacement, the system information before active replacement cannot be continued, and a trouble occurs in monitoring of the entire system, which is a problem. In the conventional system monitoring device, as the system state information for performing control of the entire system, user setting information, hardware state information, and software state information is retained. Among this, the user setting information is stored in a dedicated non-volatile memory (EEPROM) provided outside the board of the system monitoring device and can be restored even when the information in the board is lost due to active replacement. Also, since the system is not stopped, the hardware state information can be restored by reading the state information retained in the hardware side at the point when the active maintenance is completed. However, regarding the OS software state information which is a hardware control instruction of OS software, the state information is not retained at the OS software side; therefore, when the OS software state information is lost due to active replacement of the system monitoring device, it cannot be restored after the active replacement, and the OS software state information cannot be continued, which is a problem. Depending on the location, considerable time is taken in some cases until active maintenance is performed after the system monitoring device fails. If the system state information generated while the system monitoring device is stopped after the failure and until active replacement is finished, in other words, during the active replacement, is not restored, the continuity of the system state information cannot be ensured. In order to solve the problem due to failure of such a system monitoring device, there is a system having duplex system monitoring devices which is operated while the system state information is always synchronized between the two system monitoring devices. Therefore, even when the board is replaced for failure of one of the system monitoring devices, operation can be continued by using the state information stored in the other system monitoring device. However, even in the computer system having the duplex system monitoring devices, when both the system monitoring devices fail, there is a problem that the system has to be stopped in order to subject the system monitoring devices to maintenance and replacement as well as a computer system in which merely one system monitoring device is mounted, and, in addition, the state information may be lost.

DISCLOSURE OF THE INVENTION

According to one aspect of the present invention to provide a control method of a system monitoring device, a program, and a computer system which enable active replacement of a system monitoring device ensuring continuity of system state information.

(Method Corresponding to Single Board)

An embodiment of the present invention provides a control method of a system monitoring device. More specifically, an embodiment of the present invention is a control method of a system monitoring device which retains hardware state information of a computer system and OS software state information of a hardware control instruction given by OS software and monitors and controls the entire computer system, characterized by including:

a system information saving step of, when state change of the hardware state information and OS software state information is recognized, storing the information as save information in a non-volatile memory;

a save information restoration step of, when re-activation accompanying active replacement of the control method of the system monitoring device which has failed is recognized, reading the save information from the non-volatile memory and restoring the hardware state information and OS software state information before device failure;

a hardware state information restoration step of recognizing operating hardware according to the save information and restoring hardware state information generated for the recognized hardware during active replacement; and a software state information restoration step of recognizing operating OS software according to the save information and restoring OS software state information generated for the recognized OS software during active replacement.

The computer system comprises a plurality of system boards on which a plurality of CPUs, memories, input/output devices, and the like are mounted, a crossbar-type system bus connecting the plurality of system boards, hardware having power source devices, cooling fans, and the like, and a plurality of OS softwares executed on the plurality of system boards; and the save information includes at least one of:

power outage information of the entire system;

partition information such as boot, running, and stop of partitions set to divide in a combination of one or a plurality of system boards or one system board;

system board information such as dynamic configuration change of the system board, memory degeneration, LSI degeneration on the board, and PCI slot degeneration; and CPU information such as CPU degeneration information and cache degeneration information.

In the hardware state information restoration step, an interruption mask of the operating hardware recognized according to the save information is cancelled so as to restore the hardware state information generated during device stop.

In the software state information restoration step, the operating software recognized according to the save information is notified of offline cancellation so as to restore the OS software state information generated during device stop.

a user setting information management step of retaining user setting information of the computer system as system information and reserving the user setting information in a non-volatile memory; wherein, in the save information restoration step, the user setting information is read, and restored from the non-volatile memory when re-activation accompanying active replacement of the control method of the system monitoring device, which has failed, is recognized.

The user setting information includes at least one of:

entire system information including any one of a system name, air conditioning activation waiting time, warm air waiting time, an altitude of an installation site of the system, an IP address of the control method of the system monitoring device, calendar information used in automatic operation scheduling, a degeneration mode specifying the entire system or a range corresponding to a step, a power recovery mode specifying operation when power is recovered from power outage, and the like;

partition information including any one of a host ID, LAN information used in the partition, a remote power source control mode setting whether a power source control command can be transmitted/received, a diagnosis level for determining a diagnosis method, an environmental variable necessary for partition activation, and the like; and system board information including any one of a partition number specifying a partition at a time of next activation, a dividing mode which is set when the system board is logically divided into partitions, a mirror mode which is set when a memory is used in mirroring, an interleave mode in which the memory is used in interleaving, and the like.

Furthermore, in the save information restoration step, the save information is read from the non-volatile memory, and the corresponding hardware state information and OS software state information before device failure is restored when reset activation accompanying update termination of the case in which firmware of the system monitoring device itself is updated by an externally connected device is recognized;

in the hardware state information restoration step, the operating hardware is recognized according to the save information, and the hardware state information generated for the recognized hardware during firmware update is restored; and in the software state information restoration step, the operating OS software is recognized according to the save information, and the OS software state information generated during firmware update is updated (Program Corresponding to Single Board)

An embodiment of the present invention provides a program executed by a computer of a system monitoring device.

The program of an embodiment of the present invention causes a computer of a system monitoring device which retains hardware state information of a computer system and OS software state information of a hardware control instruction given by OS software and monitors and controls the entire computer system to execute a system information saving step of, when state change of the hardware state information and OS software state information is recognized, storing the information as save information in a non-volatile memory;

a save information restoration step of, when re-activation accompanying active replacement of a program which has failed is recognized, reading the save information from the non-volatile memory and restoring the corresponding hardware state information and OS software state information before device failure;

a hardware state information restoration step of recognizing operating hardware according to the save information and restoring hardware state information generated for the recognized hardware during active replacement; and a software state information restoration step of recognizing operating OS software according to the save information and restoring OS software state information generated for the recognized OS software during active replacement.

(System Corresponding to Single Board)

An embodiment of the present invention provides a computer system. More specifically, an embodiment of the present invention is a computer system which comprises a plurality of system boards on which a plurality of CPUs, memories, and the like are mounted, a crossbar-type system bus connecting the plurality of system boards, hardware having power source devices and cooling fans, and a plurality of OS softwares executed on the plurality of system boards; wherein a system monitoring device which retains hardware state information of the computer system and OS software state information of a hardware control instruction given by OS software and monitors and controls the entire computer system is provided;

the system monitoring device is characterized by having a system information saving unit which, when state change of the hardware state information and OS software state information is recognized, stores the information as save information in a non-volatile memory;

a save information restoration unit which, when re-activation accompanying active replacement of the system monitoring device which has failed is recognized, reads the save information from the non-volatile memory and restores the corresponding hardware state information and OS software state information before device failure;

a hardware state information restoration unit which recognizes operating hardware according to the save information and restores hardware state information generated for the recognized hardware during active replacement; and a software state information restoration unit which recognizes operating OS software according to the save information and restores OS software state information generated for the recognized OS software during active replacement.

(Method Corresponding to Duplex Boards)

In another mode of the control method of the system monitoring device according to the present invention, the control method of system control devices duplexed by providing two system monitoring devices which retain system information including hardware state information of a computer system and OS software state information of a hardware control instruction given by OS software, monitor and control the entire computer system, and give a notification upon abnormality occurrence, is characterized by including a system information saving step of, when state change of the hardware state information and OS software state information is recognized, storing the information as save information in a non-volatile memory;

a save information restoration step of, when re-activation of the preceding device is recognized through active replacement accompanying simultaneous failure of the two system monitoring devices, reading the save information from the non-volatile memory and restoring the corresponding hardware state information and OS software state information before device failure;

a hardware state information restoration step of recognizing operating hardware according to the save information and restoring hardware state information generated for the recognized hardware during active replacement;

a software state information restoration step of recognizing operating OS software according to the save information and restoring OS software state information generated for the recognized OS software during active replacement; and a copy restoration step of, when re-activation of the subsequent device is recognized through active replacement accompanying the simultaneous failure of the two system monitoring devices, copying and restoring the system information retained by the preceding activated system monitoring device (Program Corresponding to Duplex Boards)

Another mode of the program according to the present invention is characterized by causing a computer of duplexed system monitoring devices which retain system information including hardware state information of a computer system and OS software state information of a hardware control instruction given by OS software, monitor and control the entire computer system, and gives a notification upon abnormality occurrence, to execute:

a system information saving step of, when state change of the hardware state information and OS software state information is recognized, storing the information as save information in a non-volatile memory;

a save information restoration step of, when re-activation as the preceding device is recognized through active replacement accompanying simultaneous failure of the two system monitoring devices, reading the save information from the non-volatile memory and restoring the corresponding hardware state information and OS software state information before device failure;

a hardware state information restoration step of recognizing operating hardware according to the save information and restoring hardware state information generated for the recognized hardware during active replacement; and a software state information restoration step of recognizing operating OS software according to the save information and restoring OS software state information generated for the recognized OS software during active replacement; and a copy restoration step of, when re-activation of the subsequent device is recognized through active replacement accompanying the simultaneous failure of the two system monitoring devices, copying and restoring the system information retained by the preceding activated system monitoring device.

(System Corresponding to Duplex Boards)

In another mode of the computer system according to the present invention, in a computer system composed of a plurality of system boards on which a plurality of CPUs, memories, etc. are mounted, a crossbar-type system bus connecting the plurality of system boards, hardware having power source devices and cooling fans, and a plurality of OS softwares executed on the plurality of system boards, two system monitoring devices which retain hardware state information of the computer system and OS software state information of a hardware control instruction given by OS software and monitor and control the entire computer system are provided, wherein each of the system monitoring devices has a system information saving unit which, when state change of the hardware state information and OS software state information that is reserved merely in the system monitoring devices, lost in failure, and cannot be restored among system information is recognized, stores the information as save information in a non-volatile memory;

a save information restoration unit which, when re-activation of the preceding device is recognized through active replacement accompanying simultaneous failure of the two system monitoring devices, reads the save information from the non-volatile memory and restores the corresponding hardware state information and OS software state information before device failure;

a hardware state information restoration unit which recognizes operating hardware according to the save information and restores hardware state information generated for the recognized hardware during active replacement;

a software state information restoration unit which recognizes operating OS software according to the save information and restores OS software state information generated for the recognized OS software during active replacement; and a copy restoration unit which, when re-activation of the subsequent device is recognized through active replacement accompanying the simultaneous failure of the two system monitoring devices, copies and restores the system information retained by the preceding activated system monitoring device.

(Extended Modes)

Furthermore, the present invention can be configured in the below manner.

A control method of a system monitoring device which retains state information of a computer system and monitors and controls the computer system, is characterized by including:

a step of, when state change of the state information is recognized, storing the state information in a non-volatile memory as save information; and a step of, when activation of the system monitoring device is recognized, reading the save information from the non-volatile memory and restoring the state information corresponding to the save information.

A computer system is characterized by having a system monitoring device which retains state information indicating the state of the computer system and monitors and controls the computer system according to the state information; wherein the system monitoring device has a first memory which retains the state information, a second memory which stores the state information as save information, a system information saving unit which stores the state information in the second memory as save information, and a save information restoration unit which, when the system monitoring device is re-activated, reads the save information from the second memory and restores the state information in the first memory.

The system information saving unit operates so as to store the state information, which is generated in the computer system while the system monitoring device is stopped, in the second memory.

When the state information is changed, the system information saving unit operates so as to store the state information in the second memory.

The first memory is a volatile memory, and the second memory is a non-volatile memory.

The state information indicates the state of hardware constituting the computer system; and a hardware state information restoration unit which references the save information so as to recognize operating hardware and restores the state information about the recognized hardware in the first memory is further provided.

The state information indicates the state of software which operates in the computer system; and a software state information restoration unit which references the save information so as to recognize operating software and restores the state information about the recognized software in the first memory is further provided.

A monitoring device which monitors a system by using state information indicating the state of the receiving system has a first memory which retains the state information and is provided at a first part;

a second memory which stores the state information as save information and is provided at a second part which is physically different from the first part;

a system information saving unit which stores the state information as save information in the second memory; and a save information restoration unit which, when the system monitoring device is re-activated, reads the save information from the second memory and restores the state information in the first memory.

A computer system is characterized by having a plurality of monitoring devices which retain state information of the computer system and monitor and control the computer system; wherein the monitoring device has a first storage unit which retains the state information, an information saving unit which stores the state information, which is stored in the first storage unit, in a non-volatile second storage unit, a first restoration unit which, when the monitoring device is activated before the other monitoring device, reads the state information from the second storage unit and restores the read state information in the first storage unit, and a second restoration unit which, when the monitoring device is activated after the other monitoring device is activated, copies the state information retained by the other monitoring device and restores the information in the first storage unit.

According to the present invention, a non-volatile storage region for temporarily saving the system state information (hardware state information and OS software state information) retained by the system monitoring device is provided, and, when the information managed by the system monitoring device is changed, it is always saved in the storage region; as a result, the system state information can be transferred from the system monitoring device before replacement to the system monitoring device after replacement, the system monitoring devices can be actively replaced without stopping the system, and reliability and stability of the computer system can be further improved. Regarding the system state information generated during active replacement which causes re-activation by the active replacement after the system monitoring device fails, the already operated hardware is recognized according to the restored save information, and the interruption mask is open again; as a result, interruptions during stop can be received again, and the state change during replacement can be restored. Also with respect to hardware control instructions from OS software during stop, the already operated OS software is recognized according to restored save information, and a system monitoring device offline cancelling notification is given; as a result, the hardware control instructions from the OS software generated during stop can be received again, and the OS software state information can be restored. Also in the computer system having the duplex system monitoring devices, when double failure of the system monitoring devices occurs, the duplex system monitoring devices can actively replaced without stopping the system. Furthermore, also in the updating process of firmware which requires rebooting of the system monitoring device, an updating process ensuring the continuity of the system state information can be performed without stopping the system.

BRIEF DESCRIPTION OF DRAWINGS

FIGS. 1A and 1B are explanatory diagrams of a computer system having a system monitoring device according to an embodiment of the present invention;

FIGS. 6A and 6B are explanatory diagrams of a computer system having duplex system monitoring devices according to an embodiment of the present invention;

BEST MODES FOR CARRYING OUT THE INVENTION

Figure 1A:
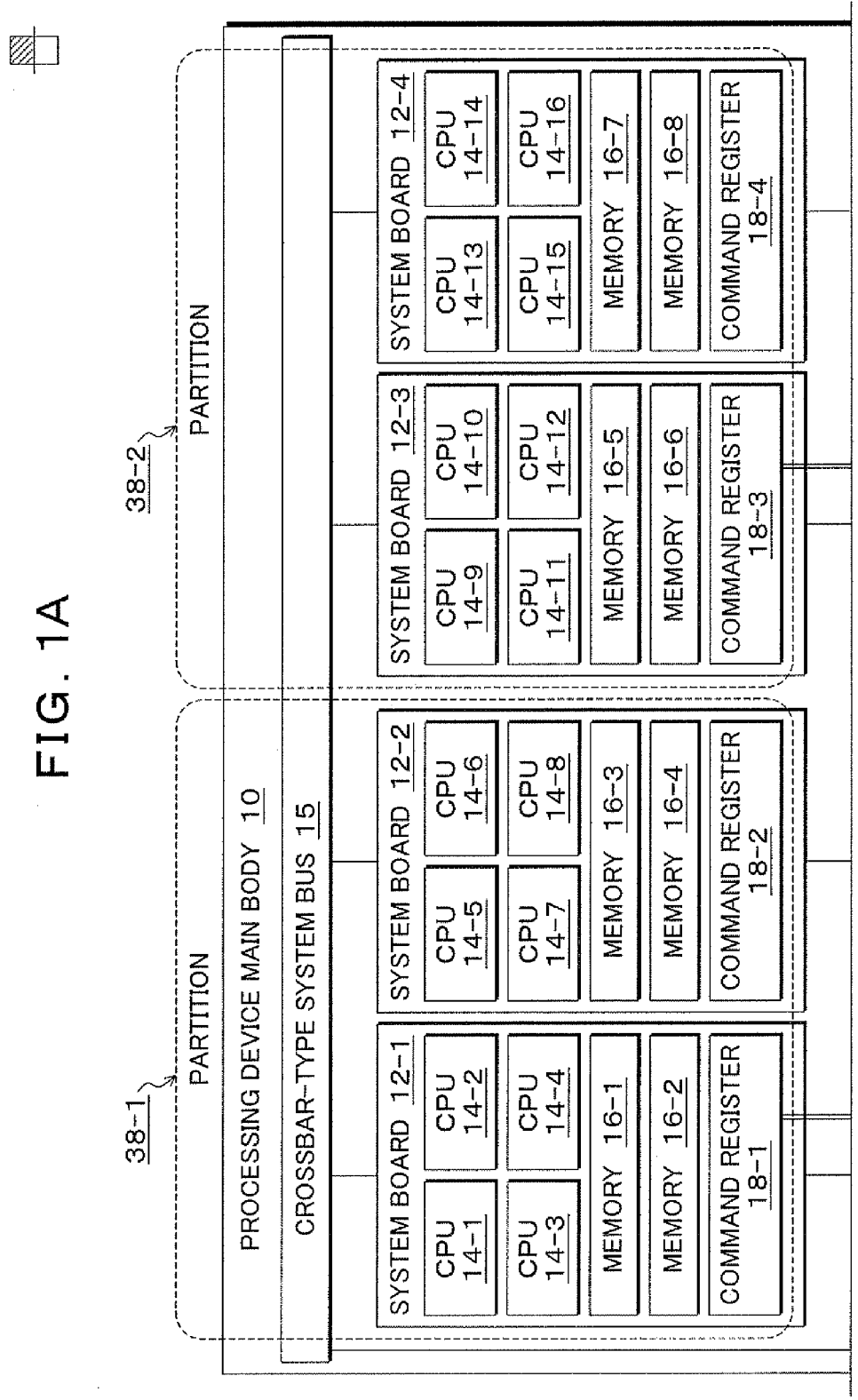

FIGS. 1A and 1B are explanatory diagrams of a computer system which is provided with a system monitoring device according to an embodiment of the present invention and is used, for example, as a server. In FIGS. 1A and 1B, in a processing device main body 10 of the computer system, for example, four system boards 14-1 to 14-4 are provided. In each of the system boards 12-1 to 12-4, for example, when the system board 12-1 is taken as an example, four CPUs 14-1 to 14-4, two memories 16-1 and 16-2, and a command register 18-1 which is used for input/output instructions by software with respect to outside are provided. The configuration of the system board 12-1 is also same in the other system boards 12-2 to 12-4, and each of them is provided with four CPUs, two memories, and one command register. The system boards 12-1 to 12-4 are mutually connected by a crossbar-type system bus 15. In addition, the processing device main body 10 is provided with power source devices 20-1 to 20-6, fan trays 22-1 to 22-6, and power source plugs 24-1 to 24-3. With respect to the processing device main body 10 which constitutes such a computer system, a system monitoring device 25 is provided. The system monitoring device 25 is generally known as a system control facility (SCF) and is mounted on one board so as to be replaceably attached to the processing device main body 10. The system monitoring device 25 is provided with a monitoring control unit 26, a restoration processing unit 37, and an information retention unit 48. The monitoring control unit 26 retains system state information including user setting information formed in the processing device main body 10, hardware state information, and OS software state information which is a hardware control instruction according to OS software and monitors controls the entire computer system. The system state information used in monitoring control of the monitoring control unit 26 is stored in an information retention unit 48 deployed in a memory. The memory in which the information retention unit 48 is deployed is a volatile memory; and, when the system monitoring device 25 stops due to failure or the like, the system information of the information retention unit 48 is lost. An operator panel 28 is provided with respect to the system monitoring device 25, and the operator panel 28 is provided with an EEPROM 30-1 as a non-volatile memory. The normal system monitoring device 25 retains user management information in the EEPROM 30-1 of the operator panel 28 so that the user setting information is not lost even when the system monitoring device 25 fails and stops. However, the hardware state information and OS software information obtained during operation of the system monitoring device 25 and stored in the information retention unit 48 is lost when it is stopped due to device failure; therefore, in the present embodiment, a SRAM 32 is further provided as a non-volatile memory for the system monitoring device 25, and a save information storage region 34 is disposed therein. In the save information storage region 34 of the SRAM 32, the information maintained and managed by the system monitoring device 25, in other words, the hardware state information and the OS software state information is stored; and, when the state information is changed, the changed information is stored therein. Moreover, even if the system monitoring device 25 fails and stops by any possibility, hardware state information and OS software state information can be saved therein. The restoration processing unit 27 provided in the system monitoring device 25 operates upon activation of the system monitoring device 25 after the system monitoring device 25 fails and active replacement is performed, reads the user setting information from the EEPROM 30-1 provided in the operator panel 28 so as to restore the information in the information retention unit on an actively replaced system monitoring device, and reads save information from the save information storage region 34 of the SRAM 32 so as to deploy the information on the memory, thereby passing the state information of the system monitoring device 25 before active replacement to the system monitoring device 25 after active replacement without any change and maintaining the continuity of the hardware state information and the OS software state information in the active replacement accompanying the failure stop. Furthermore, the restoration processing unit 27 has a processing function of restoring the hardware state information and the OS software state information generated during an active replacement period which is from when the system monitoring device 25 is stopped and until it is activated through active replacement. The state information generated during the active replacement period is the information stored in the save information storage region 34. By virtue of the function of the restoration processing unit 27, when the system monitoring device 25 fails and is subjected to active replacement, the system state information retained in the system monitoring control device 25 before active replacement and the system state information generated during the active replacement is restored in the system monitoring device 25 after the replacement, thereby causing the monitoring control to be continued based on retention of the precise system state information by the system monitoring device 25 after the active replacement. Herein, the processing device main body 10 takes the case in which the four system boards 12-1 to 12-4 are provided as an example; however, for example, it can be extended to have up to 32 system boards as a maximum configuration, and the CPU configuration of this case comprises 128 CPUs. The crossbar-type system bus 15 functions as an ultrahigh-speed system bus and can provide throughput of, for example, 133 GB/s at a maximum. The OS software that operates in the processing device main body 10 can be operated in partition units constituted by combinations of one or a plurality of system boards 12-1 to 12-4. In the present embodiment, a partition 38-1 is formed by the system boards 12-1 and 12-2, and a partition 38-2 is formed by system boards 12-3 and 12-4. The formation information of the partitions 38-1 and 38-2 is retained by the system monitoring device 25 as user setting information. When the processing device main body 10 is activated by the operator panel 28, the partitions 38-1 and 38-2 are individually built as shown in the drawing based on the partition setting information, independent boot up processes are executed in the partitions 38-1 and 38-2, respectively, so as to deploy different OS softwares on the memory, and each of them is executed by the CPU. The partitions are built basically in the system board units in the processing device main body to; however, other than this, one system board can be divided to build a plurality of partitions. For example, the system board 12-1 can be divided to comprise two partitions by using two CPUs as units. Corresponding to the OS software determined for each of the partitions 38-1 and 38-2 in this manner, the system monitoring device 25 receives and manages OS software state information serving as a hardware control instruction from the OS software by using the command register 18-1 of the system board 12-1 for the OS software of the partition 38-1. The command register 18-3 of the system board 12-3 is used for the partition 38-2 to similarly receive and retain the OS software state information which serves as a hardware control instruction from different OS software. Meanwhile, regarding the hardware state information from the CPUs, memories, and unshown I/O devices (for example, PCI slots) mounted on the system boards 12-1 to 12-4, a hardware interruption signal which is output when state change is detected in respective hardware is received so as to retain the hardware state information. A maintenance terminal device 36 is connected to the system monitoring device 25 by using a serial port 35 when needed and performs activation of the system monitoring device 25 and update of firmware provided in the system monitoring device 25. Also, when the system monitoring device 25 fails and is actively replaced by a new system monitoring device 25, the maintenance terminal device 36 is connected to the actively-replaced system monitoring device 25 by the serial port 35, activation of the actively-replaced system monitoring device 25 is performed by the maintenance terminal device 36, and the restoration processing unit 27 is caused to execute a restoration process of the system information before the replacement and during the replacement.

Figure 2:
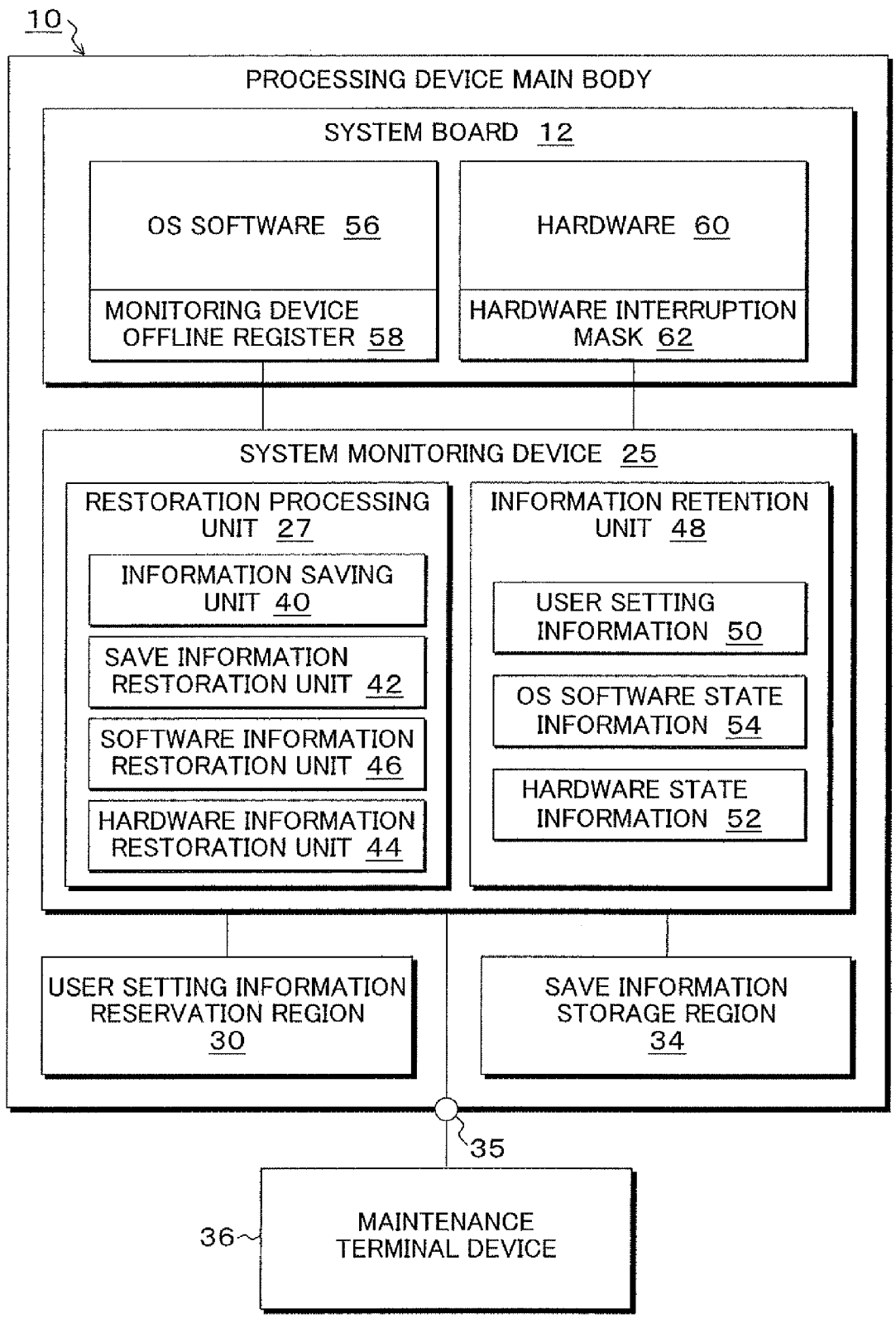
FIG. 2 is a block diagram showing a functional configuration of the system monitoring device of FIGS. 1A and 1B together with a system configuration.

FIG. 2 is a block diagram showing a functional configuration of the system monitoring device 25 of FIGS. 1A and 1B together with a system configuration of the processing device main body 10 side. In FIG. 2, merely one system board 12 is shown in order to simplify the explanation of the processing device main body 10; and, in the system board 12, hardware 56 realized by components such as the CPUs, memories, and I/O devices and OS software 56 which is executed in the partition unit shown in FIGS. 1A and 1B are provided. In the restoration processing unit 27 provided in the system monitoring device 25, the functions of an information saving unit 40, a save information restoration unit 42, a software information restoration unit 44, and a hardware information restoration unit 46 are provided. In the information retention unit 48, the user setting information 50, the OS software state information 52, and the hardware state information 54 is retained. Note that illustration of the function of the monitoring control unit 26 of FIGS. 1A and 1B is omitted in FIG. 2. With respect to the system monitoring device 25, a user information reservation region 30 using the EEPROM and the save information storage region 34 using the SRAM are provided. Furthermore, with respect to the system monitoring device 25, the maintenance terminal device 36 can be connected in accordance with needs by using the serial port 35. When the OS software state information which is a hardware control instruction generated during operation of the OS software 56 is received by an online notification, the information save unit 40 of the system monitoring device 25 retains the changed OS software state information in the information retention unit 48 and, at the same time, stores the information in the save information storage region 34. Moreover, when the hardware state information is received from the hardware 60 by hardware interruption, the information saving unit 40 stores the hardware state information in the information retention unit 48 and, at the same time, stores the information in the save information storage region 34. Therefore, in the system monitoring device 25, when the system state information managed by the device itself is changed, the information is retained in the information retention unit 48 and, at the same time, stored and saved in the save information storage region 34; as a result, even when the system monitoring device 25 fails and stops and the retained information of the information retention unit 38 is lost, the OS software state information and the hardware state information can be also reserved by saving the information in the save information storage region 34. The save information restoration unit 42 operates when the maintenance terminal device 36 is connected to the serial port 35 and the system monitoring device 25 after active replacement is activated, reads the user setting information from the user setting information reservation region 30, deploys the information as the user setting information 50 on the memory, on which the information retention unit 48 is disposed, and deploys the saved OS software state information 52 and hardware state information 54 from the save information storage region 34 on the memory constituting the information retention unit 48 so as to restore the information. The hardware information restoration unit 44 operates subsequent to restoration of the user setting information by the save information restoration unit 42 of the actively-replaced system monitoring device 25 which is activated by the maintenance terminal device 36, recognizes the already operated hardware according to the hardware state information 52 restored in the information retention unit 48, and, with respect to the recognized hardware, restores the hardware state information that is generated while the system monitoring device 25 is stopped when the device fails and until it is activated through active replacement. In restoration of the hardware state information generated during device stop, specifically, when cancelling control of a hardware interruption mask 62 of the hardware 60 is performed, the hardware corresponding to the cancelled interruption mask generates hardware interruption again, thereby restoring the hardware state information. More specifically, when the system monitoring device 25 fails and stops, a mask process of hardware interruption is performed in a hardware interruption circuit unit of the hardware 60, thereby attaining the state in which, even when the hardware 60 subjects hardware state information to interruption output, an error occurs, and interruption cannot be performed. Therefore, when the hardware interruption mask 62 is cancelled from the actively replaced system monitoring device 25 side, the corresponding hardware generates a hardware interruption again, and, based on this, the hardware state information generated during device stop accompanying active replacement of the system monitoring device 25 can be restored. The software information restoration unit 46 operates subsequent to the hardware information restoration unit 44, recognizes the already operated OS software based on the OS software state information 54 retained by the system monitoring device 25 before replacement and restored in the information retention unit 48 by the save information restoration unit 42, and, with respect to the recognized OS software, acquires the OS software state information that is a hardware control instruction from the OS software 56 generated while the device is stopped after failure of the system monitoring device 25 and until the active replacement so as to restore the information. In the acquisition of the OS software state information generated while the system monitoring device 25 is stopped, when an offline cancelling notification is given from the system monitoring device 25 to a monitoring device offline register 58 provided in the OS software 56, it can be acquired and restored. More specifically, when the system monitoring device 25 fails and stops, the online connection with the OS software 56 kept until that point is cancelled so that it is in an offline state, and the OS software state information generated in the OS software 56, that is, a hardware control instruction is stored in the monitoring device offline register 58. Therefore, in the case in which the system monitoring device 25 is activated after active replacement, when an offline cancelling notification is given to the monitoring device offline register 58 of the OS software 56, the OS software state information which is a hardware control instruction retained in the monitoring device offline register 58 is received again and restored by the system monitoring device 25. Examples of the user setting information 50, the hardware state information 52, and the OS software state information 54 retained in the information retention unit 48 of the system monitoring device 25 include the followings. First of all, the user setting information 50 can be divided into that of the whole system, the partitions, and the system boards, and each of above has the following information. The information about the whole system includes:

(1) system name,
(2) air conditioning activation waiting time,
(3) warm air waiting time,
(4) cord setting of storing a cord of the device,
(5) the IP address of the system monitoring device 25,
(6) calendar information used in scheduling for automatic operation,
(7) specification of a degeneration mode of part or the entirety of the processing device main body,
(8) a power recovery mode specifying the operation when power is recovered from power failure and the like.

The user setting information about the partition includes the followings.

(1) A host ID which is an ID purchased by a customer
(2) LAN setting information used by the partition
(3) A remote power source control mode which is the setting that enables transmission/reception of a power source control command
(4) A diagnosis level for determining a diagnosis method
(5) An OBP environmental variable which is an environmental variable necessary for partition activation, for example, specification of boot device Furthermore, the user setting information relating to the system board includes the followings.

(1) Specification of the partition number that operates at a time of next activation
(2) A dividing mode which is set when the system board is logically divided
(3) A memory mirror mode which is set when the memories are used in a mirror mode
(4) An interleave mode which is set when the memories are used in an interleave mode Next, the save information stored in the save information storage region 34 can be divided into that of the whole system, the partitions, the system boards, and the CPUs, and each of the information is like the following save information.

(1) About the whole system, power outage information that records the partitions operated at a time of power outage
(2) About the partitions, partition information indicating the state such as stop, during boot, and OS running
(3) About system boards,
A. TR status that records the state of dynamic configuration change,
B. memory degeneration information that stores the information of partially degenerated memories,
C. LSI degeneration information that stores the degeneration state of each LSI on the system board, and
D. PCI degeneration information that stores the degeneration state of PCI slots are included.

(4) As the save information of CPUs,
A. CPU degeneration information that stores the degeneration information of each CPU and
B. cache degeneration information that stores the degeneration information of caches of the CPUs is included.

The hardware interruptions from the hardware 60 with respect to the system monitoring device 25 include the following.

(1) The hardware interruptions from the system boards include
A. interruptions of temperature abnormality, cache abnormality, and others from the CPUs,
B. interruptions of 1-bit abnormality, 2-bit abnormality, and others from memory controllers, and
C. interruptions such as path abnormality between the CPUs from system controllers.
(2) Interruptions such as parity errors from a crossbar board on which the crossbar-type system bus 15 is mounted
(3) Power source interruptions such as power source abnormality and environmental temperature abnormality
(4) Fan interruptions such as rotation abnormality Furthermore, the hardware control instructions, that is, OS software state information from the OS software 56 include, for example:

(1) state notification with respect to various hardware components,
(2) partition power source control instructions,
(3) reading and reserving of OBP environmental variables, and
(4) dynamic configuration change instructions.

Figure 3:
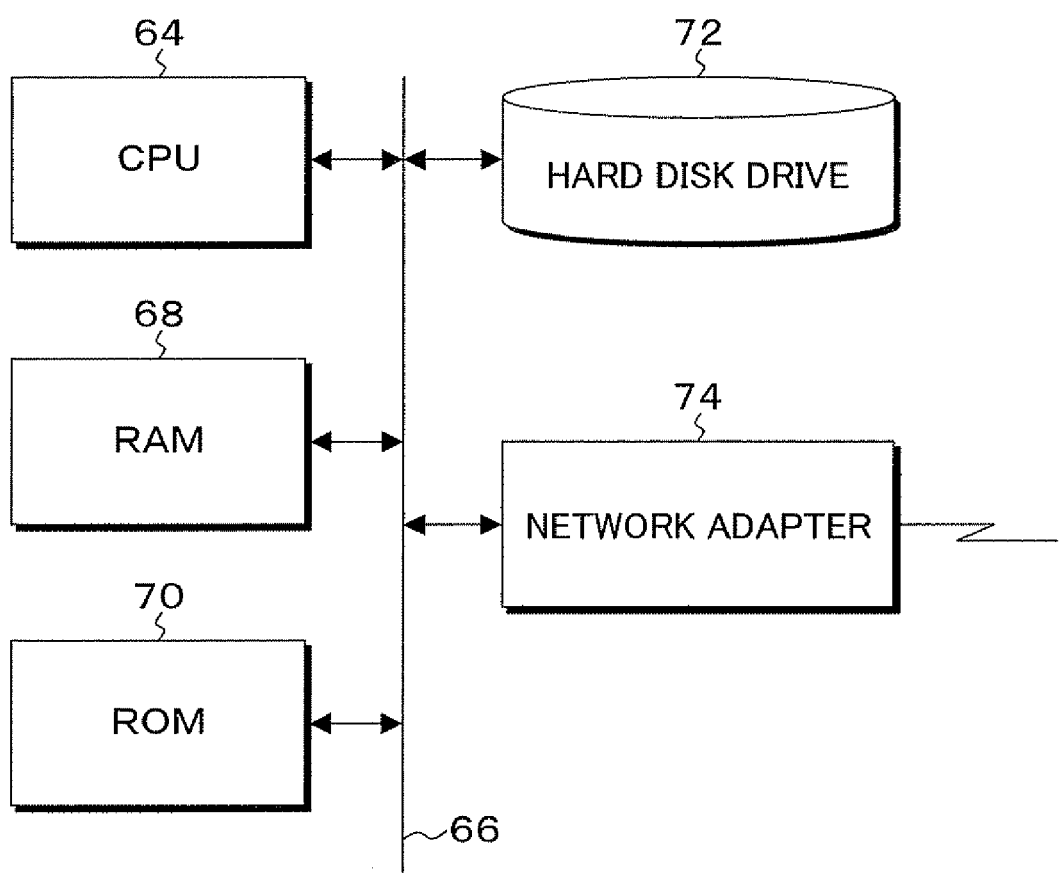
FIG. 3 is a block diagram of a hardware environment of the system monitoring device of FIG. 2.

FIG. 3 is a block diagram of a hardware environment of the system monitoring device 25 of FIG. 2. In FIG. 3, the system monitoring device 25 in the present embodiment has a CPU 64; and, a RAM 68, a ROM 70, a hard disk drive 72, and a network adapter 74 are connected to a bus 66 of the CPU 64. In the hard disk drive 72, a program or firmware for performing monitoring control of the system control device is installed, it is activated by an instruction from the maintenance terminal device 36 connected to the serial port via the network adapter 74, an OS is deployed to the RAM 68 from the hard disk drive 72 through a boot process, and a program for system control is further deployed and executed by the CPU 64. Note that, although the system control device of FIG. 3 has the hard disk drive 72, an OS and a system control program as an application may be stored in the ROM 70, deployed in the RAM 68, to execute without providing the hard disk drive 72. Next, the procedure of active replacement of the case in which the system monitoring device 25 fails during system operation in the processing device main body 10 of FIGS. 1A and 1B will be described below.

(1) When failure occurs in the system monitoring device 25 and it is stopped, the system monitoring device 25 does not respond to interruptions from the hardware 60, and the hardware interruption mask 62 is set. The OS software 56, which has been online until that point, is changed to offline, and hardware control instructions are reserved in the monitoring device offline register
(2) Maintenance staff who received a failure notification of the system monitoring device 25 arrives and replaces the failed system monitoring device 25 without stopping the system.
(3) The maintenance terminal device 36 is connected to the serial port 35 of the replaced system monitoring device 25, and the system monitoring device 25 is activated.
(4) Restoration processes of the user setting information, the hardware state information, the information before failure and during failure of the OS software state information are performed in the activated system monitoring device 25; and, when restoration is terminated and the system monitoring device 25 is in an operated state, a termination notification of the replacement operation is displayed in the maintenance terminal device 36.

Figure 4:
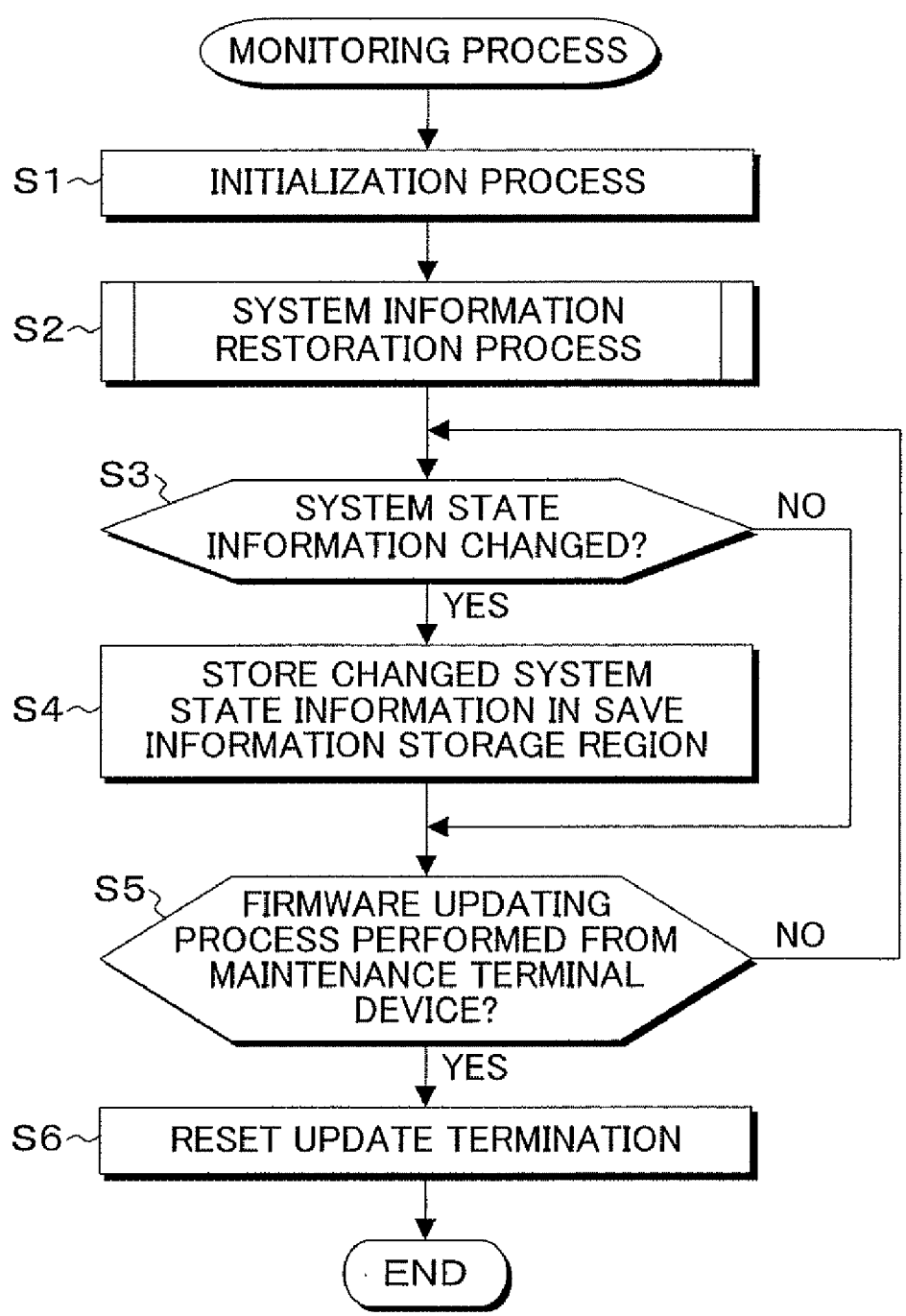
FIG. 4 is a flow chart of a monitoring process by the system monitoring device of FIG. 2.

FIG. 4 is a flow chart of a monitoring process performed when the system monitoring device 25 is activated by connecting the maintenance terminal device 36 via the serial port 35 after the system monitoring device 25 fails and stops during operation of the processing device main body 10 of FIG. 2, and it is actively replaced by another system monitoring device 25. In FIG. 4, when the actively replaced system monitoring device 25 is activated by the maintenance terminal device 36, an initialization process is executed in step S1 and a system information restoration process is then executed in step S2. When the system information restoration process is normally terminated the process proceeds to step S3 in which whether the system state information is changed or not is monitored. In step S4, if there is a change, the changed system state information is stored in the save information storage region 34. Furthermore, whether an updating process of firmware is performed from the maintenance terminal device 36 or not is checked in step S5. When the firmware updating process is performed, reset of update termination and starting thereafter is automatically performed in step S6. Therefore, in response to this, the processes from step S1 are repeated.

Figure 5A:
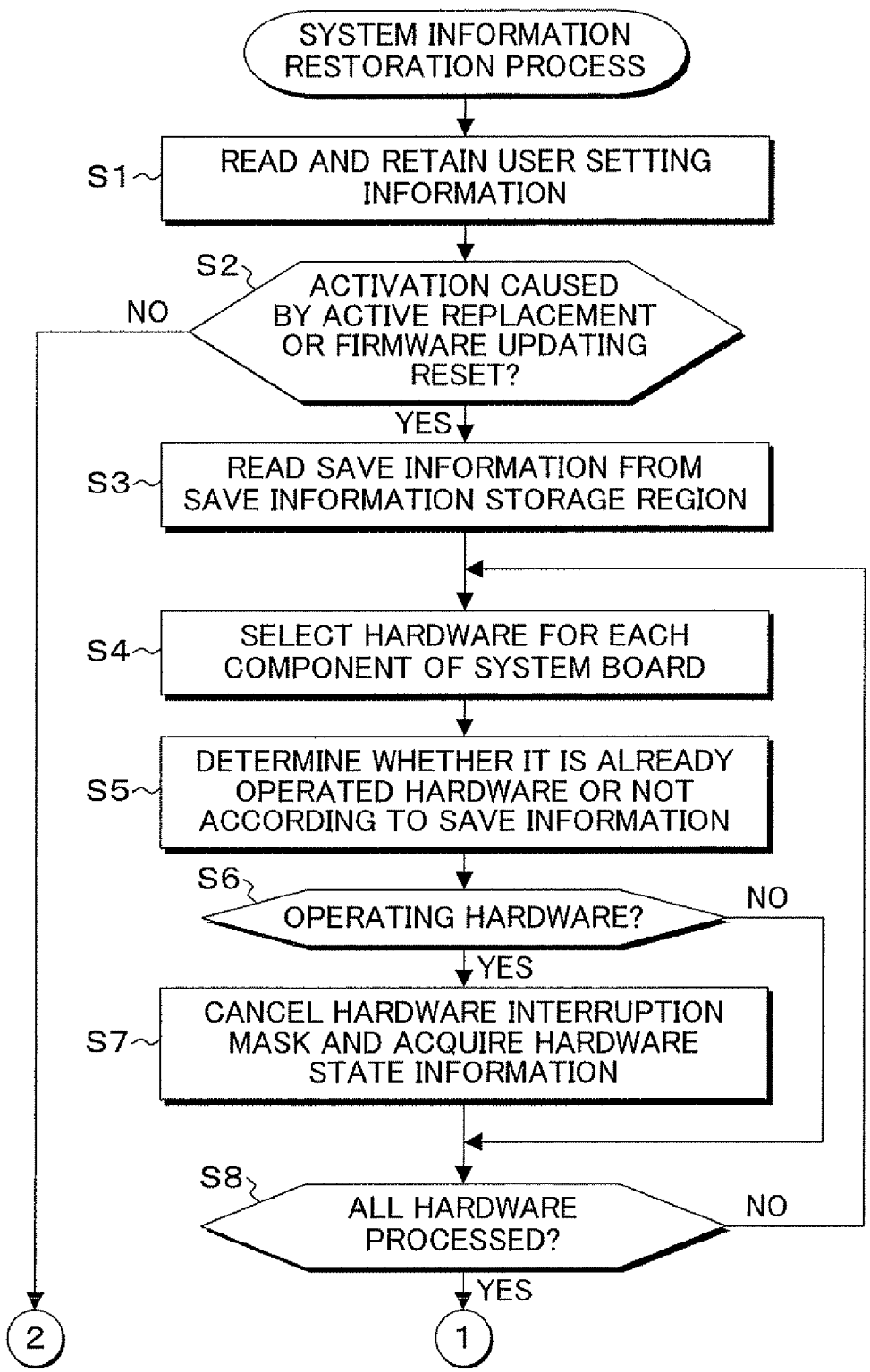
FIGS. 5A and 5B are flow charts of a system information restoration process in step S2 of FIG. 4.
Figure 5B:
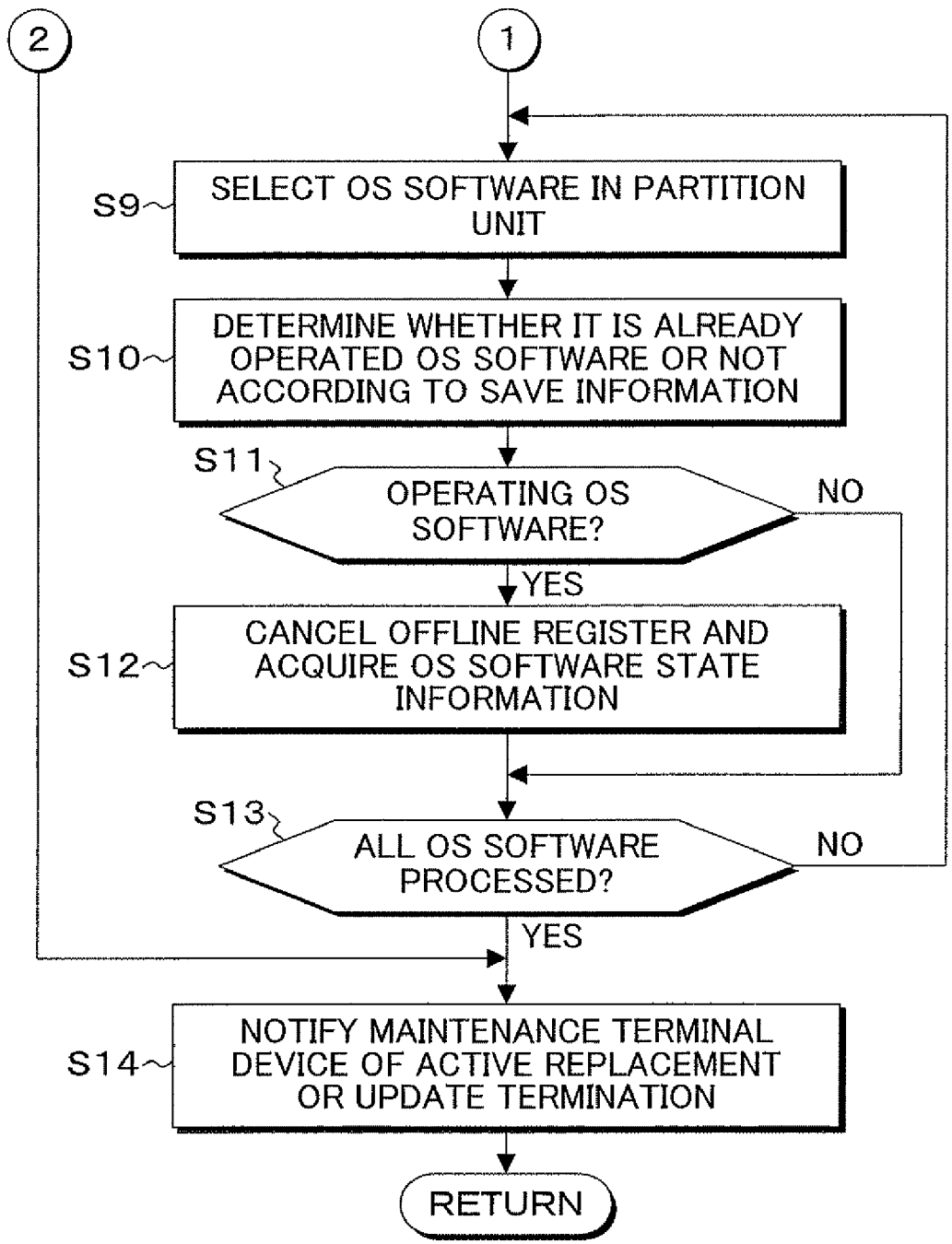

FIGS. 5A and 5B are flow charts of the system information restoration process in step S2 of FIG. 4. In FIGS. 5A and 5B, in the system information restoration process, in step S1, the user setting information reserved in the user setting information reservation region 30 is read and retained in the information retention unit 48. Subsequently, in step S2, whether it is activation caused by active replacement or firmware update reset is checked. If it is activation caused by active replacement, the process proceeds to step S3 in which the save information is deployed from the save information storage region 34 to the memory constituting the information retention unit 48 like the hardware state information 52 and the software state information 54. Next, in step s4, hardware is selected for each component such as the CPU, memory, and IO device of the system board, and whether it is the already operated hardware or not is determined according to the save information which is deployed in step S3. When it is determined to be the operating hardware in step S6, the interruption mask of the determined hardware is cancelled, and the hardware state information is acquired and retained in step S7. The processes of steps S4 to S7 are repeated until the processes of all the hardware is terminated in step S8. Subsequently, OS software is selected in the partition unit in step S9, and whether it is the already operated OS software or not is determined according to the read save information in step S10. When it is determined to be the operating OS software in step S11, the process proceeds to step S12 in which the monitoring device offline register allocated to the command register on the system board of the partition of the determined OS software is cancelled, and the OS software state information which is a hardware control instruction is received again and acquired. Subsequently, whether all the OS software has been processed or not is checked in step S13, and the processes from step S9 are repeated until all the processes are finished. When a series of such restoration processes is finished, the maintenance terminal device 36 is notified of the termination of the active replacement in step S14, and the process returns to the main routine of step S4. Next, the firmware updating process with respect to the system monitoring device 25 of FIG. 2 will be described. When the firmware of the system monitoring device 25 provided in the processing main body 10 is to be updated by externally connecting the maintenance terminal device 36, the firmware is updated without stopping the processing device main body 10, and the system monitoring device 25 is reset and started when update of the firmware is completed. Along with the reset start of the system monitoring device 25 after the firmware update, the system monitoring device 25 once stops; therefore, the user setting information 50, the hardware state information 52, and the OS software state information 54 of the information retention unit 48 is lost. Therefore, in the present embodiment, also in the case of the reset start after the firmware update, as well as the case of the active replacement accompanying failure stop of the system monitoring device 25, the system state information before firmware update is started and the system state information during firmware update is restored by the processing operation of the restoration processing unit 27. The operation procedure for the firmware update of the system monitoring device 25 is described below.

(1) The maintenance terminal device 36 is connected to the serial port 35 of the system monitoring device 25, and the firmware of a new version is written to the system monitoring device 25.

(2) The system monitoring device 25 is reset and then activated.

(3) Along with the activation of the system monitoring device 25, restoration processes of the user setting information, hardware state information, and OS software state information are performed, and, when the restoration is completed and a normal operation state is attained, update termination of the firmware is displayed in the maintenance terminal device 36. Such processes accompanying the firmware updating process in the system monitoring device 25 are the processes at the point of activation accompanying firmware update in steps S5 and S6 of FIG. 4 and in the system information restoration process of FIGS. 5A and 5B.

Figure 6A:
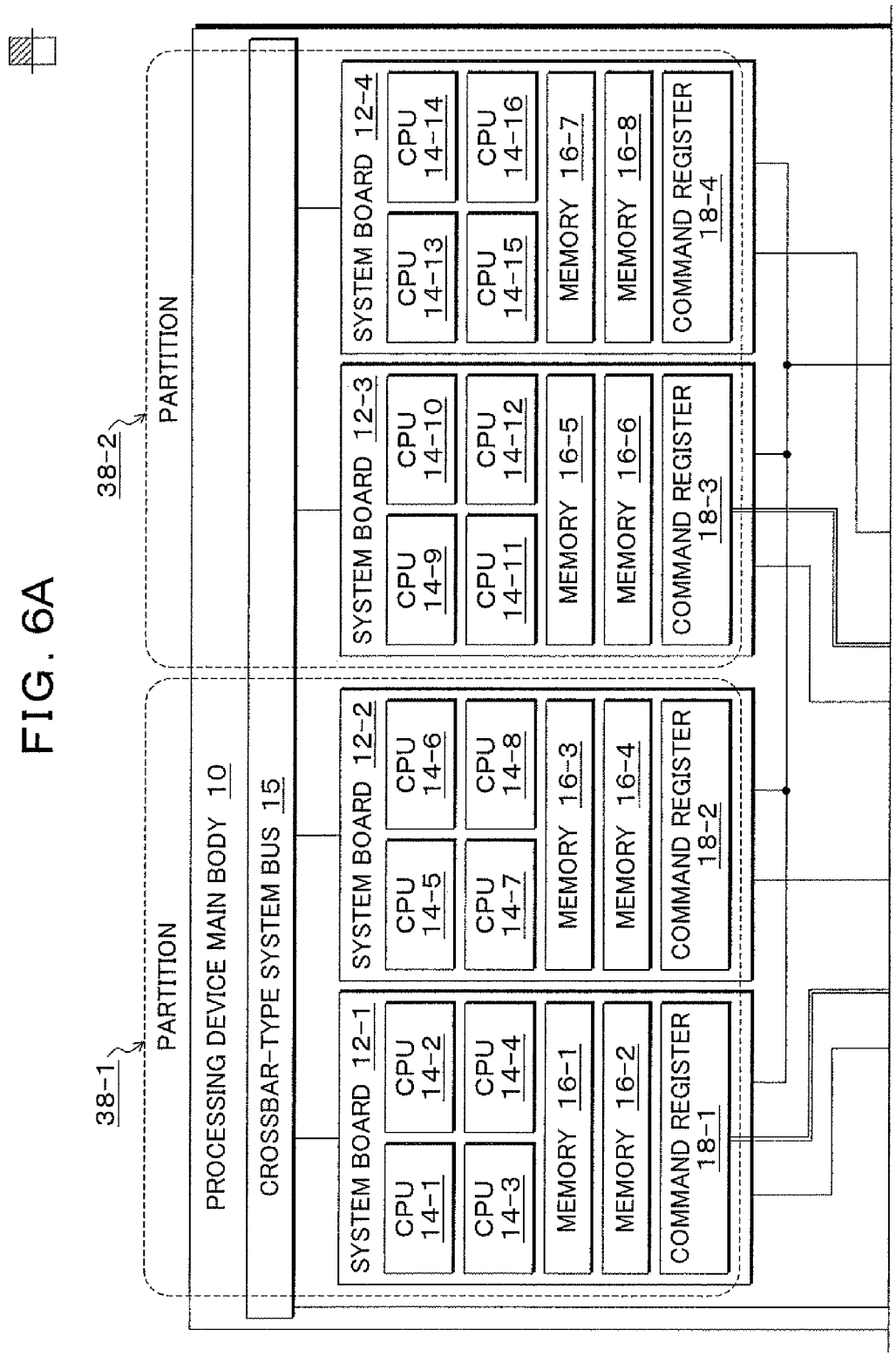

FIGS. 6A and 6B are explanatory diagrams of a computer system in which the system monitoring device of the present embodiment is duplex. In FIGS. 6A and 6B, a system monitoring device 25-1 and a system monitoring device 25-2 are provided in the processing device main body 10; for example, the system monitoring device 25-1 serves as a primary, the system monitoring device 25-2 serves as a secondary, and, with respect to the same processing device main body 10, the user setting information, the hardware state information, and the OS state information necessary for monitoring control of the entire system is retained while synchronizing the information. When the system monitoring device 25-1 at the primary side fails, processing is transferred to the system control device 25-2 at the secondary side; and, when the system control device 25-2 at the secondary side fails, control of the system control device 15-2 at the primary side is maintained, and the failed side is actively replaced, thereby continuing the system monitoring function. However, when both the system monitoring devices 25-1 and 25-2 fail and stop at the same time, both of them have to be replaced, and, in the present embodiment, the two system monitoring devices 25-1 and 25-2 can be actively replaced without stopping the system comprising the processing device main body 10. In the system monitoring device 25-1, the monitoring control unit 26, the restoration processing unit 27, and the information retention unit 48 are provided, and the same functions are also provided in the system monitoring device 25-2. The EEPROM 30-1 which reserves the user setting information is provided in the operator panel 28, and the save information storage region 35 which saves the hardware state information and the OS software state information is provided in the SRAM 32. The system monitoring devices 25-1 and 25-2 have serial ports 35-1 and 35-2, respectively, and the maintenance terminal device 36 is connected to either one of them in accordance with needs so as to enable activation after active maintenance or update of firmware.

Figure 7A:
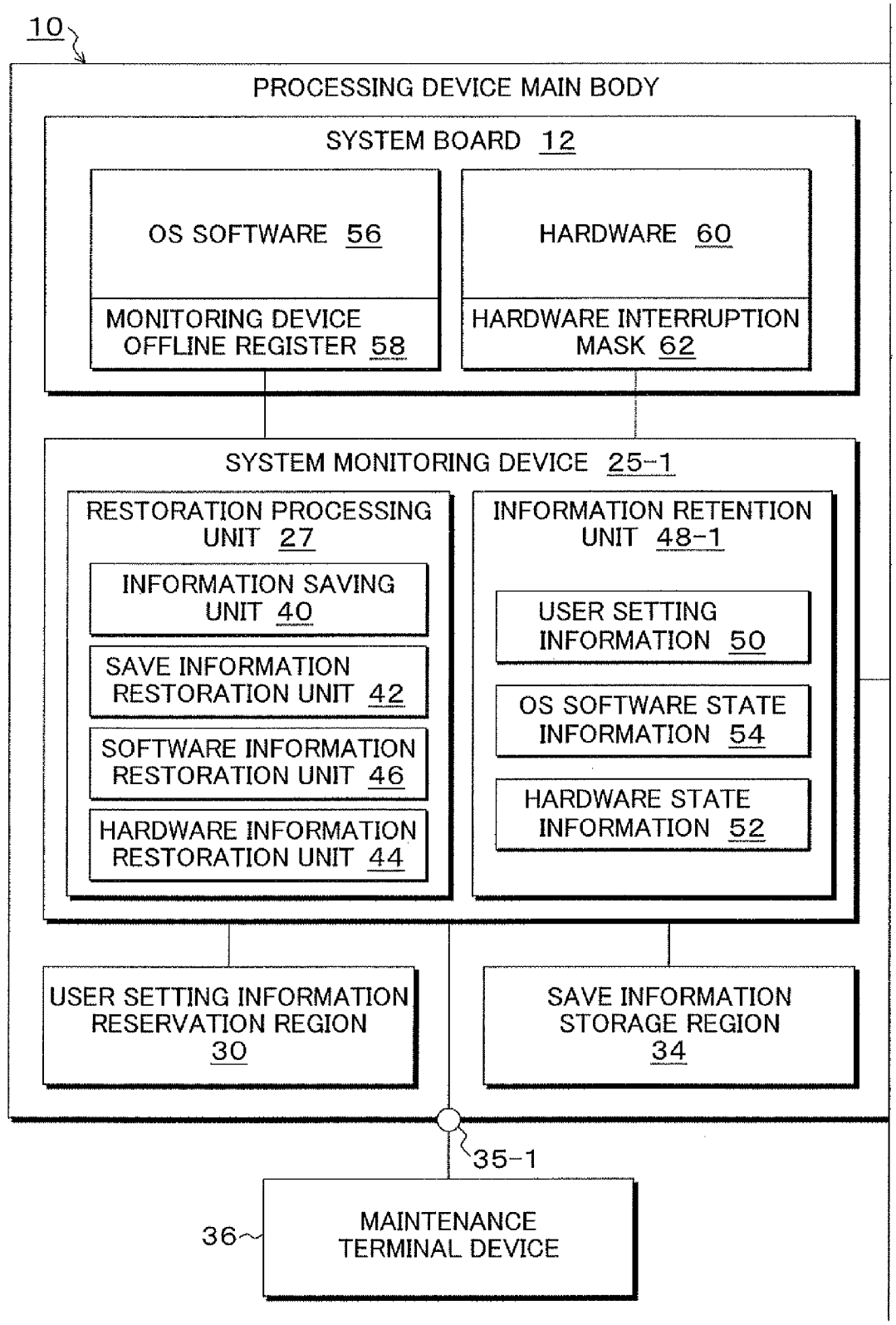
FIGS. 7A and 7B are block diagrams showing a functional configuration of a system monitoring device according to an embodiment of the present invention together with a system configuration.
Figure 7B:
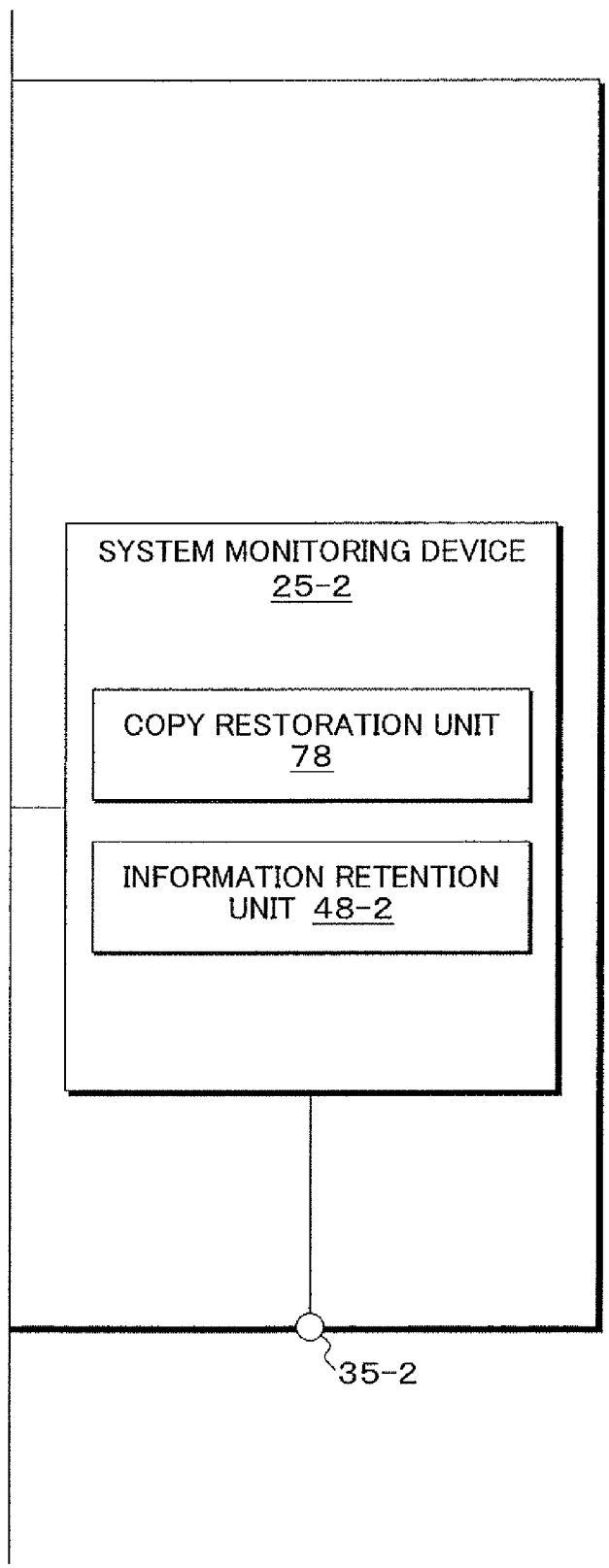

FIGS. 7A and 7B are block diagrams showing a functional configuration of the duplex system monitoring devices of FIGS. 6A and 6B together with the system configuration. In FIGS. 7A and 7B, the system monitoring devices 25-1 and 25-2 provided with respect to the system board 12 of the processing device main body 10 show the functional configuration of the case in which the system monitoring device 25-1 serves as a primary side, and the system monitoring device 25-2 serves as a secondary side. In the system monitoring device 25-1 at the primary side, as well as the case of the single system monitoring device 25 shown in FIG. 2, the information saving unit 40, the save information restoration unit 42, the software information restoration unit 44, and the hardware information restoration unit 46 are provided; and an information retention unit 48-2 retains the user setting information 50, the hardware state information 52, and the OS software state information 54. Meanwhile, in the system monitoring device 25-2 serving as the secondary side, a copy restoration unit 78 and an information retention unit 48-2 are provided. Note that, when the system control device 25-1 at the primary side fails, the functions of the information saving unit 40, the save information restoration unit 42, the software information restoration unit 44, and the hardware information restoration unit 46 are built in the system control device 25-2 at the secondary side. When the a change of the OS software state information serving as a hardware control instruction from the OS software 56 in the system board 12 and a change of the hardware state information caused by a hardware interruption from the hardware 60 are received, the system monitoring device 25-1 at the primary side of the duplex case retains them in an information retention unit 48-1 and, at the same time, stores them in the save information storage region 34. The information save unit 40 of the system monitoring device stores them in the save information storage region 34 and, at the same time, notifies the system monitoring device 25-2 at the secondary side of the changed hardware state information and OS software state information in order to synchronize them, thereby causing the information retention unit 48-2 to retain the information to achieve synchronization. Meanwhile, the operation procedure of the active maintenance of the case in which both the system monitoring devices 25-1 and 25-2 fail is as described below.

(1) When the system monitoring devices 25-1 and 25-2 fail and stop, responses to hardware interruptions from the hardware 60 are not given, the hardware interruption mask 62 is set, the OS software 56 is caused to be offline, and hardware control instructions of the OS software 56 are stored in the monitoring device offline register 58.

(2) Maintenance staff arrives and replaces the failed two system monitoring devices 25-1 and 25-2 without stopping the processing device main body 10.

(3) The maintenance terminal device 36 is connected to the serial port 35-1 of the system monitoring device 25-1 at the primary side so as to activate it.

(4) When the save information is restored and normal activation is performed in activation of the system monitoring device 25-1 at the primary side, replacement termination is displayed in the maintenance terminal device 36.

(5) Subsequently, the maintenance terminal device 36 is connected to the serial port 35-2 of the system monitoring device 25-2 at the secondary side so as to activate it.

(6) The system monitoring device 25-2 at the secondary side is activated, and the user setting information 50, the hardware state information 52, and the OS software state information 54 is read from the information retention unit 48-1 of the system monitoring device 25-1 at the already normally activated primary side and copied to the information retention unit 48-2, thereby restoring the information in copy restoration unit 78; and, when the restoration is completed, replacement termination of the system monitoring device 25-2 is displayed in the maintenance terminal device 36.

Figure 8:
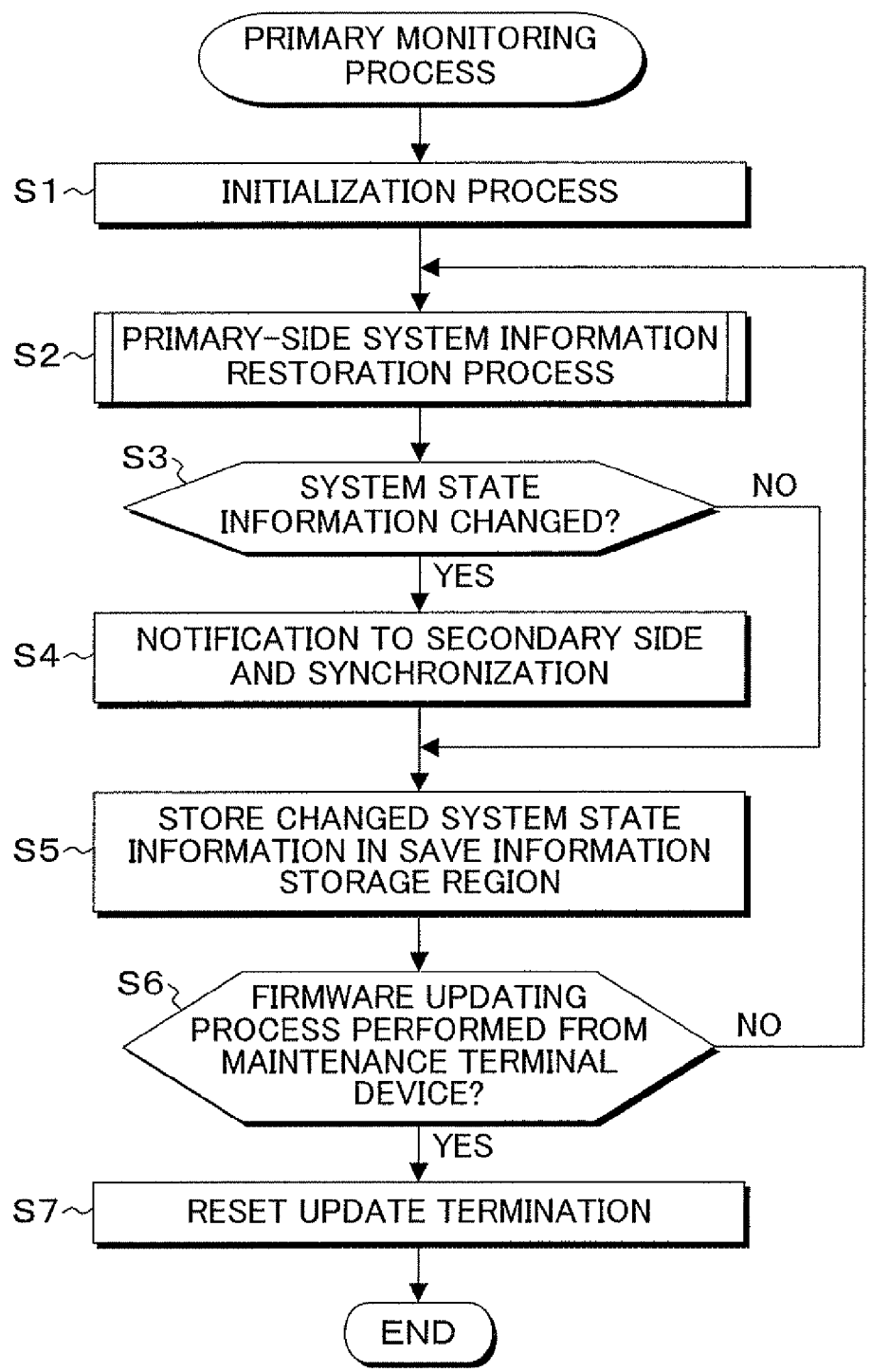
FIG. 8 is a flow chart of a primary-side monitoring process by the system monitoring device of FIGS. 7A and 7B.

FIG. 8 is a flow chart of a primary monitoring process which is performed along with activation of the system monitoring device 25-1 at the primary side by the maintenance terminal device 36 after the duplex system monitoring devices 25-1 and 25-2 of FIGS. 7A and 7B are actively replaced due to failure. In the primary monitoring process, when the system monitoring device 25-1 at the primary side is activated, an initialization process of step S1 is executed at first; and, subsequently, in step S2, a primary side system information restoration process is performed, and monitoring control is started when restoration is terminated. Subsequently, whether the system state information is changed or not during monitoring control is checked in step S3. If it is changed, the system monitoring device 25-2 at the secondary side is notified of it in step S4 so as to achieve synchronization. Then, the information is stored in the save information storage region 34 in step S5. Subsequently, whether a firmware update termination process is performed by the maintenance terminal device 36 or not is checked in step S6. If it is not performed, the processes from step S2 are repeated. When the updating process of firmware by the maintenance terminal device 36 is determined in step S6, a reset process accompanying the update termination is performed in step S7, and the processes from step 1 are repeated when activation after the reset is performed by the maintenance terminal device 36.

Figure 9A:
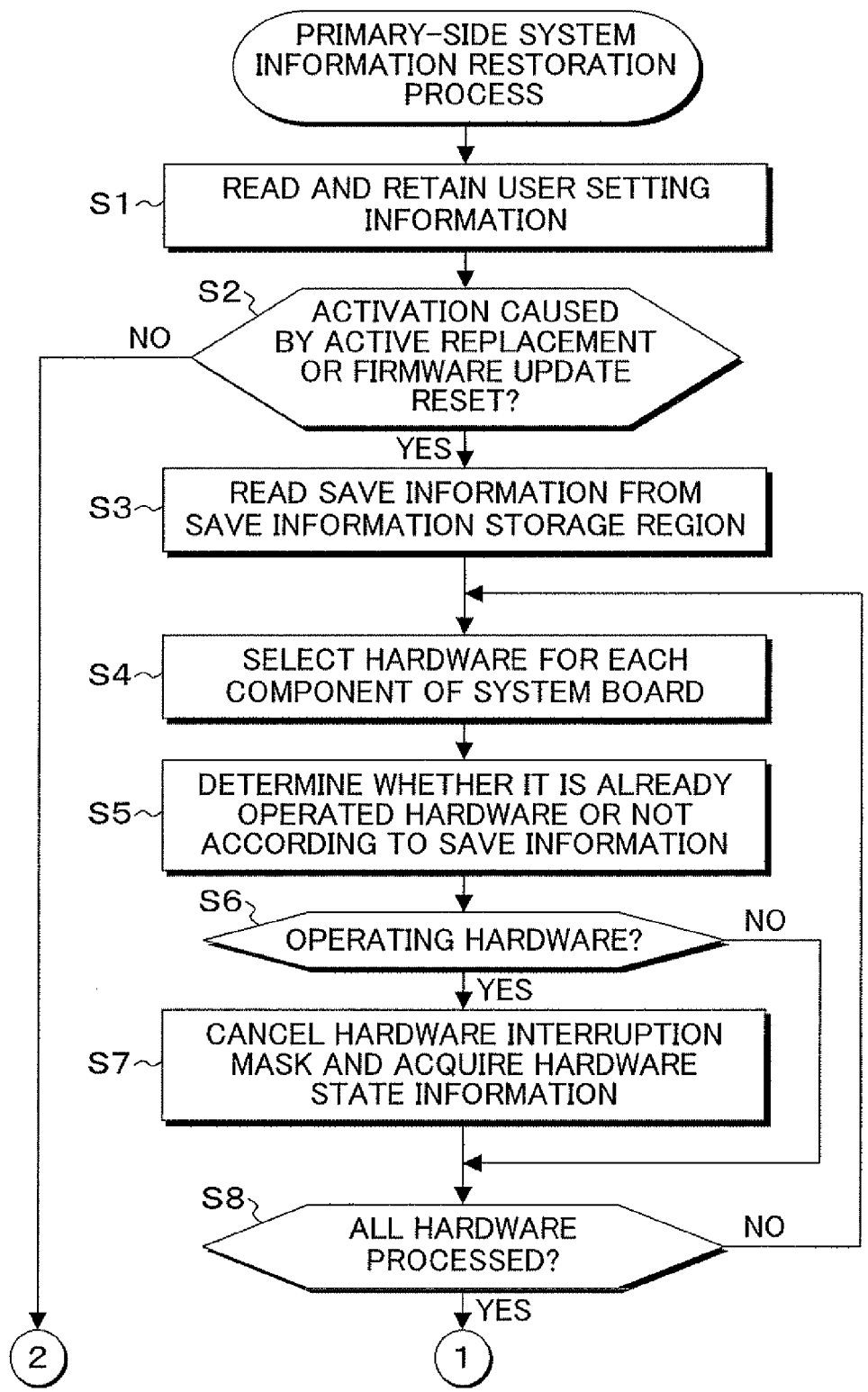
FIGS. 9A and 9B are flow charts of a primary-side system information restoration process in step S2 of FIG. 8.
Figure 9B:
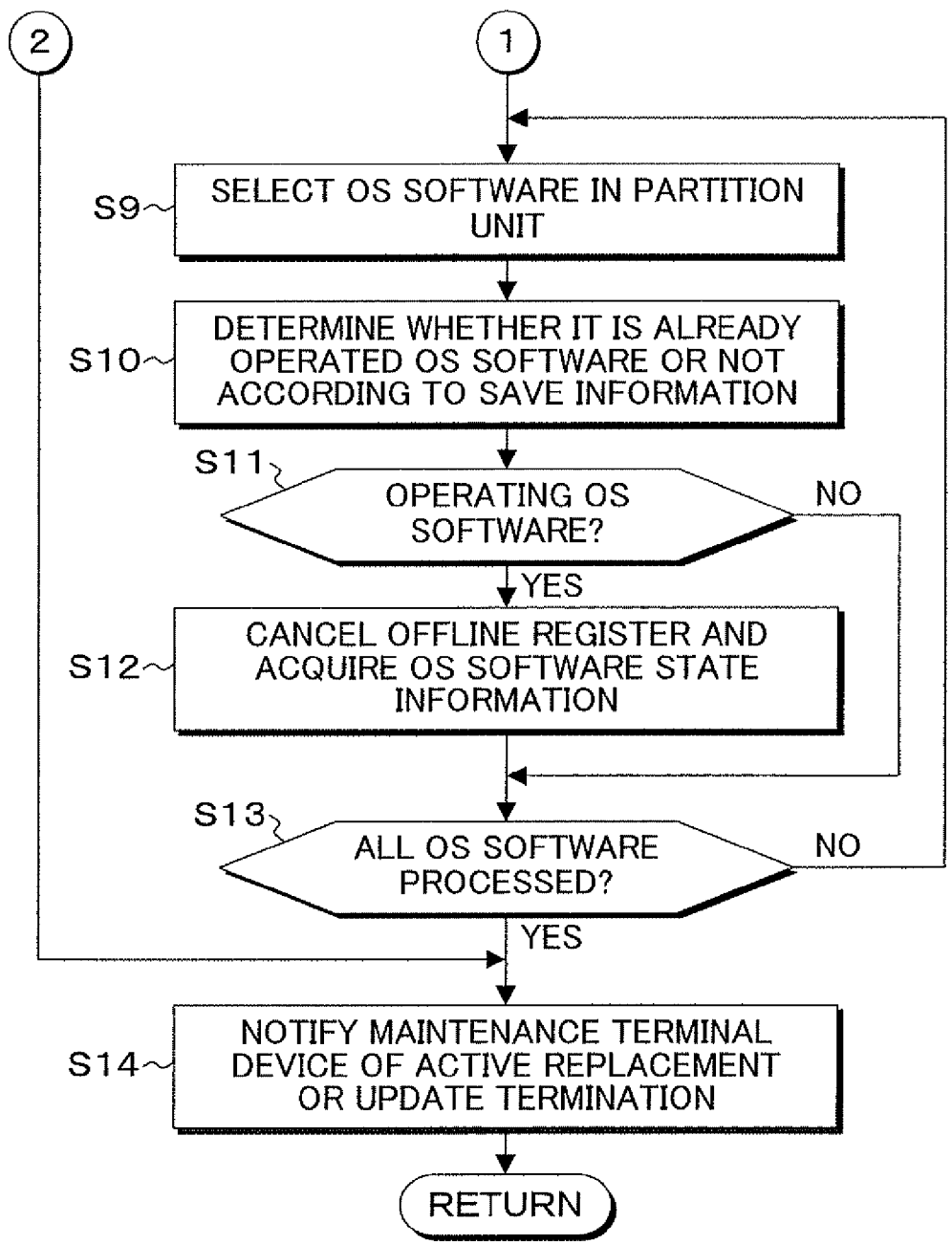

FIGS. 9A and 9B are flow charts of the primary-side system information restoration process in step S2 of FIG. 8. The processes of steps S1 to S14 in the primary-side system information restoration process are completely same as the processes of the case shown in FIGS. 5A and 5B in which one system monitoring device 25 is provided.

Figure 10:
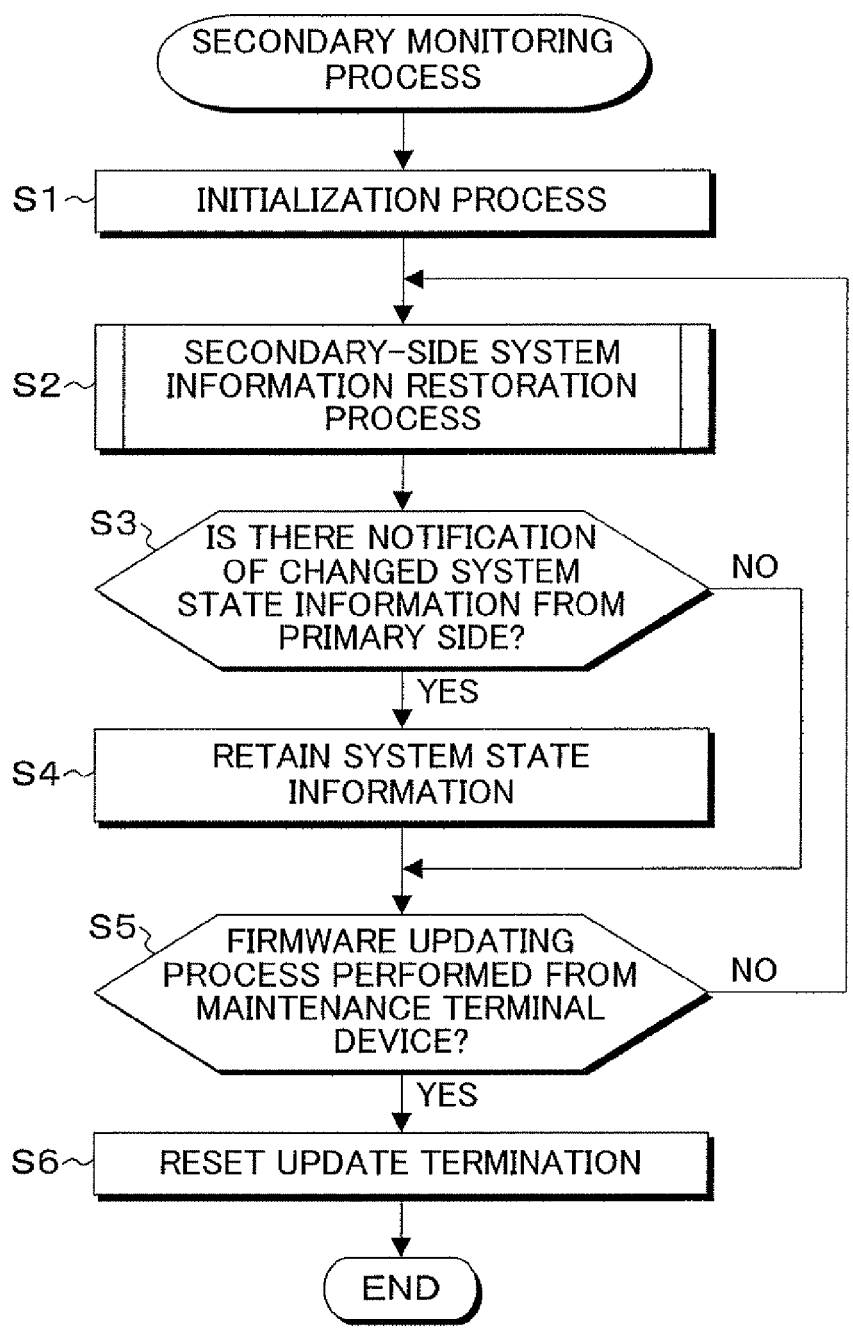
FIG. 10 is a flow chart of a secondary-side monitoring process by the system monitoring device of FIGS. 7A and 7B.

FIG. 10 is a flow chart of a secondary monitoring process of the case in which the system monitoring device 25-2 at the secondary side is activated through connection of the maintenance terminal device 36 during system operation by the processing device main body 10. In the secondary monitoring process, after it is activated by an activation instruction from the maintenance terminal device 36, an initialization process is executed in step S1, and a secondary side system information restoration process is executed in step S2. Subsequently, whether there is a change notification of the system information from the primary side or not is checked in step S3. When there is the notification, the notified system state information is retained in step S4. Whether an updating process of firmware is performed or not by the maintenance terminal device 36 is checked in step S5. When the firmware updating process is performed a reset process is performed along with update termination in step S6, and the operation is stopped. Then, the processes from step S1 are started again when activation by the maintenance terminal device 36 is performed.

Figure 11:
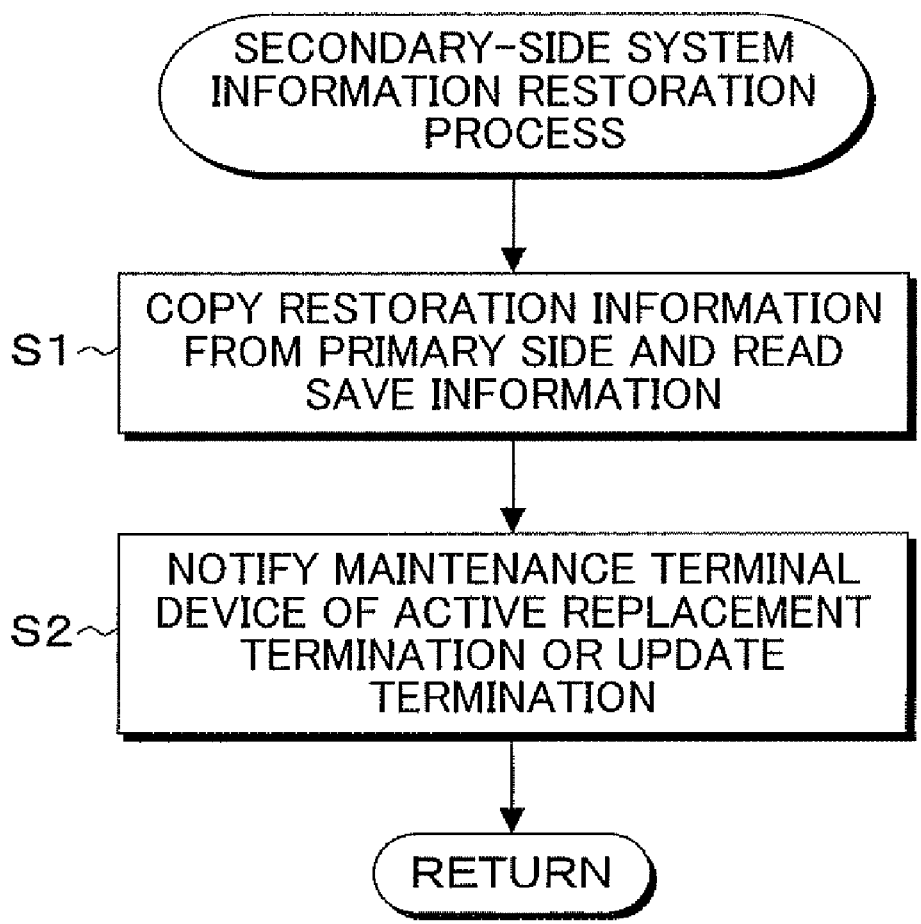
FIG. 11 is a flow chart of the secondary-side system information restoration process in step S2 of FIG. 10.

FIG. 11 is a flow chart of the secondary-side system information restoration process in step S2 of FIG. 10. In FIG. 11, in the secondary-side system information restoration process, the restored information at the primary side is copied and retained in step S1, and the maintenance terminal device is notified of active replacement termination or update termination of firm ware so that the device is caused to display it. The present invention also provides a program executed by the system monitoring devices. This program has the contents of the flow charts of FIG. 4 and FIGS. 5A and 5B when the single system monitoring device is provided and has the contents shown in the flow charts of FIG. 8 to FIG. 11 when the duplex system monitoring devices 25-1 and 25-2 are provided. Note that the present invention is not limited to the above described embodiments and includes arbitrary modifications that do not impair the object and advantages thereof. Furthermore, the present invention is not limited by the numerical values shown in the above described embodiments.

The invention claimed is:

1. A method for controlling a system monitoring device which retains hardware state information of a computer system and OS software state information of a hardware control instruction given by OS software and monitors and controls the computer system, the method comprising:
storing the information managed by the system monitoring device as save information in a non-volatile memory located outside the system monitoring device itself, when state change of the hardware state information and OS software state information is recognized during operation of the computer system;
reading the save information from the non-volatile memory and restoring the corresponding hardware state information and OS software state information to respective pre-failure states when re-activation accompanying active replacement of the system monitoring device which has failed is recognized;
recognizing operating hardware according to the save information and restoring hardware state information generated for the recognized hardware during active replacement; and
recognizing operating OS software according to the save information and restoring OS software state information generated for the recognized OS software during active replacement.

2. The control method of the system monitoring device according to claim 1, wherein
the save information includes at least one of:
power outage information of the entire system;
partition information such as boot, running, and stop of partitions set to divide in a combination of one or a plurality of system boards or one system board;
system board information such as dynamic configuration change of the system board, memory degeneration, LSI degeneration on the board, and PCI slot degeneration; and
CPU information such as CPU degeneration information and cache degeneration information.

3. The control method of the system monitoring device according to claim 1, wherein the restoring cancels an interruption mask of the operating hardware recognized according to the save information so as to restore the hardware state information generated during active replacement.

4. The control method of the system monitoring device according to claim 2, wherein the restoring cancels an interruption mask of the operating hardware recognized according to the save information so as to restore the hardware state information generated during active replacement.

5. The control method of the system monitoring device according to claim 1, comprising
retaining user setting information of the computer system and reserving the user setting information in a dedicated non-volatile memory; wherein
in the restoring, the user setting information is read and restored from the non-volatile memory when re-activation accompanying active replacement of the control method of the system monitoring device, which has failed, is recognized.

6. A method to control a system monitoring devices duplexed by disposing two system monitoring devices which retain hardware state information of a computer system and OS software state information of a hardware control instruction given by OS software and monitor and control the computer system, the method comprising:
executing a system information saving operation of, when state change of the hardware state information and OS software state information is recognized during operation of the computer system, storing the information managed by the system monitoring device as save information in a non-volatile memory located outside the system monitoring device itself;
executing a save information restoration operation of, when re-activation of the preceding device is recognized through active replacement accompanying simultaneous failure of the two system monitoring devices, reading the save information from the non-volatile memory and restoring the corresponding hardware state information and OS software state information to respective pre-failure states;
executing a hardware state information restoration operation of recognizing operating hardware according to the save information and restoring hardware state information generated for the recognized hardware during active replacement;
executing a software state information restoration operation of recognizing operating OS software according to the save information and restoring OS software state information generated for the recognized OS software during active replacement; and
executing a copy restoration operation of, when re-activation of the subsequent device is recognized through active replacement accompanying the simultaneous failure of the two system monitoring devices, copying and restoring the system information retained by the preceding activated system monitoring device.

7. The control method of the system monitoring devices according to claim 6, wherein
the save information includes at least one of:
power outage information of the entire system;
partition information such as boot, running, and stop of partitions set to divide in a combination of one or a plurality of system boards or one system board;
system board information such as dynamic configuration change of the system board, memory degeneration, LSI degeneration on the board, and PCI slot degeneration; and
CPU information such as CPU degeneration information and cache degeneration information.

8. The control method of the system monitoring devices according to claim 6, wherein an interruption mask of the operating hardware recognized according to the save information is cancelled so as to restore the hardware state information generated during active replacement.

9. The control method of the system monitoring device according to claim 6, wherein the operating software recognized according to the save information is notified of offline cancellation so as to restore the OS software state information generated during device stop.

10. The control method of the system monitoring devices according to claim 6, including
executing a user setting information management operation of retaining user setting information of the computer system as system information and reserving the user setting information in a dedicated non-volatile memory; wherein
the user setting information is read and restored from the non-volatile memory when re-activation accompanying active replacement of the control method of the system monitoring device, which has failed, is recognized.

11. The control method of the system monitoring device according to claim 6, wherein
in the save information restoration operation, the save information is read from the non-volatile memory, and the corresponding hardware state information and OS software state information before device failure is restored when reset activation accompanying update termination of the case in which firmware of the system monitoring device itself is updated by an externally connected device is recognized;
in the hardware state information restoration operation, the operating hardware is recognized according to the save information, and the hardware state information generated for the recognized hardware during firmware update is restored; and
in the software state information restoration operation, the operating OS software is recognized according to the save information, and the OS software state information generated during firmware update is restored.

12. A computer system comprising:
a system monitoring device which retains state information indicating the state of the computer system, and monitors and controls the computer system according to the state information,
the system monitoring device including:
a first memory which retains the state information,
a second memory located outside the system monitoring device itself which non-volatily stores the state information as save information,
a system information saving unit which, when state change of the computer system is recognized during operation of the computer system, stores the state information in the second memory as save information when state change of the state information is recognized, and
a save information restoration unit which, when the system monitoring device is re-activated, reads the save information from the second memory and restores the state information in the first memory to pre-failure states.

* * * * *